US011489679B2

(12) United States Patent
Soundararajan et al.

(10) Patent No.: US 11,489,679 B2
(45) Date of Patent: Nov. 1, 2022

(54) METHODS AND SYSTEMS FOR SUBMISSION AND VALIDATING DECENTRALIZED VERIFIABLE CLAIMS IN A PHYSICAL WORLD

(71) Applicant: HEWLETT PACKARD ENTERPRISE DEVELOPMENT LP, Houston, TX (US)

(72) Inventors: Abilash Soundararajan, Bangalore (IN); Michael Reid Tennefoss, Santa Clara, CA (US); Arpit Bhatt, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 338 days.

(21) Appl. No.: 16/921,802

(22) Filed: Jul. 6, 2020

(65) Prior Publication Data

US 2022/0006651 A1 Jan. 6, 2022

(51) Int. Cl.
*H04L 9/32* (2006.01)
*G06K 7/10* (2006.01)
(Continued)

(52) U.S. Cl.
CPC ........ *H04L 9/3263* (2013.01); *G06K 7/10366* (2013.01); *G06K 19/0723* (2013.01); *H04W 12/069* (2021.01); *G16Y 40/50* (2020.01)

(58) Field of Classification Search
CPC ............... H04L 9/3263; H04W 12/069; G06K 7/10366; G06K 19/0723; G16Y 40/50
(Continued)

(56) References Cited

U.S. PATENT DOCUMENTS 10,097,356 B2 10/2018 Zinder
11,050,763 B1 * 6/2021 Lyle ..................... H04L 63/126
(Continued)

FOREIGN PATENT DOCUMENTS

CN 107682331 2/2018

OTHER PUBLICATIONS

Panarello, A. et al., Blockchain and IoT Integration: A Systematic Survey, Sensors, Aug. 6, 2018, 31 pgs., vol. 18, No. 8., MDPI, Basel, Switzerland.
(Continued)

*Primary Examiner* — Samson B Lemma
(74) *Attorney, Agent, or Firm* — Sheppard Mullin Richter & Hampton LLP

(57) ABSTRACT

Methods and systems for implementing Blockchain-based verifiable claims for use with assets in a physical world, such as Internet-of-Things (IoT) devices, are described. Verifiable claims are integrated with Root of Trust (RoT) technology, in a manner that allows verifiable claims to be linked with physical assets and a "proof" of provisioning of decentralized identity to be established. A system integrates Blockchain and IoT technologies, including Blockchain IoT device with hardware RoT implemented thereon. A validation process leverages RoT of the device to establish a decentralized "proof" of RoT on the Blockchain, which can then be used as a verifiable claim for the device. The validation process can also use the "proof" of RoT to further validate data obtained from the Blockchain IoT device, and to validate business logic allowing context based control of any subsequent transactions. Further, the validation process achieves automation with respect to trustability.

19 Claims, 8 Drawing Sheets

(51) Int. Cl.
    *G06K 19/07*     (2006.01)
    *H04W 12/069*     (2021.01)
    *G16Y 40/50*     (2020.01)

(58) Field of Classification Search
    USPC ........................................................ 713/168
    See application file for complete search history.

(56) References Cited

U.S. PATENT DOCUMENTS

| | | | |
|---|---|---|---|
| 11,367,065 B1* | 6/2022 | Umezurike | G06Q 20/363 |
| 2016/0300234 A1 | 10/2016 | Moss et al. | |
| 2020/0005296 A1* | 1/2020 | Green | H04L 9/3297 |
| 2020/0092106 A1* | 3/2020 | Leong | H04L 9/3239 |
| 2020/0092704 A1* | 3/2020 | Singh | H04L 67/10 |
| 2021/0089514 A1* | 3/2021 | Werner | G06F 21/64 |
| 2021/0091960 A1* | 3/2021 | Werner | H04L 9/50 |

OTHER PUBLICATIONS

W3C, Verifiable Credentials Data Model 1.0, Mar. 28, 2019, 96 Pgs.

\* cited by examiner

METHODS AND SYSTEMS FOR SUBMISSION AND VALIDATING DECENTRALIZED VERIFIABLE CLAIMS IN A PHYSICAL WORLD

DESCRIPTION OF RELATED ART

Generally, "Internet of Things" (IoT) refers to the interconnection of devices within a local and/or wide area network infrastructure, including the Internet. The IoT enables a wide-range of applications in which virtually any type of physical thing may provide information about itself or its surroundings and/or may be controlled remotely via client devices. Moreover, there are technologies, namely Blockchain, that use data constructs for providing, and ultimately verifying, information.

One such construct, which is particularly supported in Blockchain, is a verifiable claim. In the broad sense, a claim is a statement about a subject that ties the subject to a specific context (or property). With respect to Blockchain, a verifiable claim is information that is cryptographically trustworthy, that can be shared between untrusted parties as a proof that is anchored to the Blockchain's public ledger by the credential issuer. Typically in Blockchain, this proof is in the form of a digital signature. An example of a verifiable claim could be a digitally issued driver's license that includes information about the person (to whom the digital asset is issued) that links the individual to a specific context (e.g., being over 18 years of age). As IoT technology advances and the number of IoT devices continues to expand, it may be desirable to integrate structures, such as verifiable claims, that provide secure, privacy respecting, and machine-verifiable information for use by IoT devices, systems, and applications, collectively known as the "IoT ecosystem.".

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Systems and techniques, as disclosed herein, support the integration of Blockchain-based verifiable claims for use with physical assets, such as physical devices within an Internet of Things (IoT) ecosystem consisting of IoT devices, systems, and applications. Currently, verifiable claims are only applied to digital assets in Blockchain systems. Furthermore, the disclosed techniques distinctively leverage Root of Trust (RoT) technology. RoT technology is typically implemented at the hardware level, and utilized to secure the operation of IoT systems. The system and techniques, as disclosed herein, achieve integration of verifiable claims and RoT technology, such that the verifiable claims can be linked with physical assets, as well as digital assets. Furthermore, decentralization and automation of the processes for validating existing verifiable claims and creating new verifiable claims are realized for physical assets, for example in the IoT ecosystem. Accordingly, the disclosed techniques overcome challenges that may be encountered when attempting to automate the verification of trust between untrusted parties. Achieving this type of automation is particularly significant for physical assets within or used by the IoT ecosystem because the physical assets communicating with and within the IoT ecosystem are typically untrusted.

The disclosed verifiable claims techniques can establish a decentralized Proof of RoT regarding the data collected from physical devices communicating information in/as part of an IoT ecosystem. For example, data collected from physical assets, such as IoT sensors, can be signed using the Proof of RoT on the Blockchain. Thereafter, this cryptographic event can be used for data validation by users of that physical asset in the future.

Figure 1:
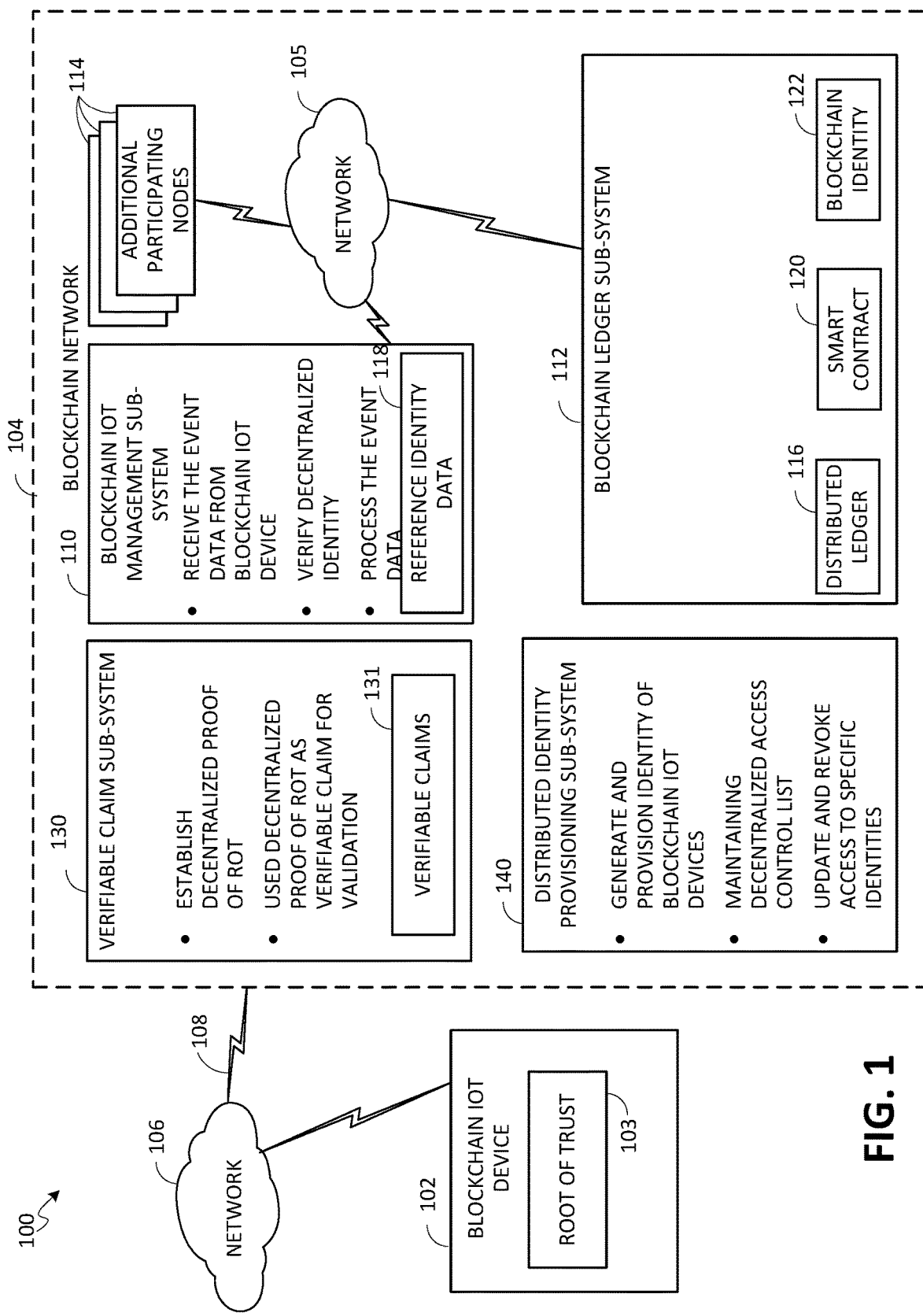
FIG. 1 illustrates an example of a Blockchain-based Internet of Things (IoT) system that integrates the use of verifiable claims and Root Of Trust (RoT) technology, according to some embodiments.

Referring now to the drawings, in FIG. 1, an example of a Blockchain-based IoT system 100 (hereinafter referred to as a Blockchain IoT system 100) that implements verifiable claims for physical assets is illustrated. As shown in FIG. 1, the Blockchain IoT system 100 may include a Blockchain IoT device 102 (including RoT 103) and a Blockchain network 104. The RoT 103 can be embedded within, or otherwise implemented by, hardware of the Blockchain IoT device 102. As a general description, the RoT 103 can be a set of functions in a trusted hardware computing module of the IoT device 102. Thus, the RoT 103 is typically protected, secure, and tamper-resistant. For instance, the RoT 103 can have a secure central processing unit (CPU) that runs secure software/firmware. Security features supported in the RoT 103 are defined by the software running on that secure CPU. The resources around the CPU of the RoT 103 will help facilitate the security and performance of these functions. The RoT 103 can serve as a separate compute engine, for instance controlling a trusted computing platform cryptographic processor on the Blockchain IoT device 102. Accordingly, the RoT 103 can enable the Blockchain IoT device 102 to perform cryptographic functions like Advanced Encryption Standard (AES).

To provide some background, attempts are being made to integrate RoT and Blockchain, predominantly in the areas of provisioning identity and tracking software modification. However, utilizing RoT as a framework for the validation and creation of Blockchain-based verifiable claims (particularly in a fully autonomous fashion), is a concept that is uniquely achieved by the Blockchain IoT system 100 and techniques disclosed therein.

The Blockchain network 104 may be coupled to the Blockchain IoT device 102 via a network 106. The network 106 may refer to a medium that interconnects the Blockchain IoT device 102 and the Blockchain network 104. Examples of the network 106 may include, but are not limited to: an Internet Protocol (IP) or non-IP-based local area network (LAN); wireless LAN (WLAN); personal area network (PAN); machine-to-machine networks (M2M); metropolitan area network (MAN); wide area network (WAN); a cellular communication network; and the Internet. Communication over the network 106 may be performed in accordance with various communication protocols such as, but not limited to: Transmission Control Protocol and Internet Protocol (TCP/IP); User Datagram Protocol (UDP); IEEE 802.11; and cellular communication protocols over communication links 108. The communication links 108 may be enabled via a wired (e.g., copper, optical communication, etc.) or wireless (e.g., Wi-Fi®, cellular communication, satellite communication, Bluetooth® communication technologies. In some examples, the network 106 may be enabled via private communication links including, but not limited to: communication links established via Bluetooth®; cellular communication; optical communication; radio frequency communication; and the like.

Although a Blockchain IoT device 102 is depicted in FIG. 1, the Blockchain IoT system 100 including more than one such Blockchain IoT devices is also envisioned, without limiting the scope of the present disclosure. Examples of the Blockchain IoT device 102 may include, but are not limited to, a radio frequency identification (RFID) tag, an RFID scanner, a Bluetooth device, a Near-Field Communication Reader (e.g., an NFC or Bluetooth reader), a sensor unit, or combinations thereof. In some examples, the Bluetooth device may be a Bluetooth Low Energy (BLE) device or a BLE tag. As will be understood, during operation, the Blockchain IoT device 102 may generate data, hereinafter referred to as an event data. By way of example, Blockchain IoT device 102 may be embodied as a RFID scanner that generates event data representative of particulars associated with an RFID tag being scanned by the RFID scanner. The particulars associated with the RFID tag may include information pertaining to an object (e.g., device, component, machine, etc.) to which the RFID tag is applied. Similarly, in some examples, the Blockchain IoT device 102, when embodied as a Bluetooth reader, may generate an event data that is representative of particulars associated with a Bluetooth device associated with an object.

In some examples, the event data generated by the Blockchain IoT device 102 may be communicated to the Blockchain network 104 via the network 106. The Blockchain IoT device 102 may send the event data to a Blockchain IoT management sub-system 110 (described later) of the Blockchain network 104 when an event occurs. The term "event" as used herein may refer to an act that causes the Blockchain IoT device 102 to generate event data. For example, the event may be an instance wherein the Blockchain IoT device 102, in this example, the RFID scanner, scans the RFID tag, which in turn causes the RFID scanner to generate the event data. In another example, the event may be an instance when the Blockchain IoT device 102 (embodied as a Bluetooth device) generates event data.

In some examples, the Blockchain IoT device 102 may have been assigned an identity. The identity assigned to the Blockchain IoT device 102 may uniquely identify the Blockchain IoT device 102 among other IoT devices (not shown). The term "decentralized identity" as used herein may refer to a self-sovereign identifier provisioned to the Blockchain IoT device 102 without any intervening or centralized administrative authorities. For example, in the Blockchain IoT system 100 of FIG. 1, the decentralized identity may be provisioned to the Blockchain IoT device 102 from the Blockchain network 104 (described later). The decentralized identity may be used by the Blockchain IoT device 102 to present a verifiable claim to the Blockchain network 104. In particular, the Blockchain IoT device 102 may sign or attest to the event data generated by the Blockchain IoT device 102 using its decentralized identity. In some examples, the event data generated by the Blockchain IoT device 102 may include a signature based on its decentralized identity.

In accordance with some aspects of the present disclosure, the decentralized identity may include a public key, a private key, and an attribute corresponding to the Blockchain IoT device 102 issued by the Blockchain network 104 to the Blockchain IoT device 102. The term "attribute" as used herein may refer to one or more additional identification details of the Blockchain IoT device 102 including, but not limited to: a class of the Blockchain IoT device 102; an identification number of the Blockchain IoT device 102; details of a custodian of the Blockchain IoT device 102; a name or identification of an organization in which the Blockchain IoT device 102 is deployed; a country of the organization; a city of the organization; information about a building of the organization in which the Blockchain IoT device 102 is deployed; a floor of the building in which the Blockchain IoT device 102 is deployed; a zone on the floor in which the Blockchain IoT device 102 is deployed; or location coordinates of the Blockchain IoT device 102. In some embodiments, the decentralized identity may be maintained in the form of a Decentralized Identifier Document (DID) that describes how to use that specific decentralized identity.

As noted hereinabove, the Blockchain network 104 may be coupled to the Blockchain IoT device 102 via the network 106. The Blockchain network 104 may be implemented as a public Blockchain network, a private Blockchain network, or a hybrid Blockchain network having combination of both the public Blockchain network and the private Blockchain network. As used herein, the term "public Blockchain network" may refer to a Blockchain network that is accessible to any entity and whereby any entity may participate in a consensus process in the public Blockchain network. A public Blockchain network may also be referred to as a "fully decentralized" Blockchain network. Further, the term "private Blockchain network" as used herein, may refer to a Blockchain network where a limited set of trusted entities participate. In particular, in the private Blockchain network, a permissioned set of participating nodes may participate in the consensus process. By way of example, a consortium of multiple financial institutions may form a private Blockchain network. A right to read Blockchain data from the private Blockchain network may be restricted to trusted participating nodes. The private Blockchain network may also be referred to as a permissioned Blockchain network. Although some examples are described herein with respect to the private Blockchain network, it should be appreciated that the technology disclosed herein may be adapted for use in public or hybrid Blockchain networks.

The Blockchain network 104, as depicted in FIG. 1, may be implemented as a consortium. For example, the Blockchain network 104 may be implemented by an enterprise consortium of companies that operate the Blockchain network 104. By way of example, the Blockchain network 104 may include a plurality of participating nodes, including but not limited to, the Blockchain IoT management sub-system 110, the verifiable claim sub-system 130, a Blockchain ledger sub-system 112, and one or more additional participating nodes 114.

Each of the participating nodes 114 may be a computing node such as a computer, a device including a processor or microcontroller and/or any other electronic component, device or system that performs one or more operations according to one or more programming instructions. Examples of the participating nodes 114 may include, but are not limited to, a desktop computer, a laptop, a ruggedized mobile computer, a smartphone, a server system, a computer appliance, a gateway, a data gathering panel, a remote terminal unit, a programmable logic controller, a workstation, and the like. In the Blockchain network 104, the participating node 114 may be connected to each other via a network 105. In some examples, the network 105 may be analogues to the network 104. In certain examples, the participating node 114 may be connected to each other via the network 104.

Although not shown, each of the participating nodes 114 may include at least one processing resource and a machine readable medium. Non-limiting examples of the processing resource may include a microcontroller, a microprocessor, central processing unit core(s), application-specific integrated circuit (ASIC), a field programmable gate array (FPGA), etc. The machine readable medium may be a non-transitory storage medium, examples of which include, but are not limited to: a random access memory (RAM); a read-only memory (ROM); an electrically erasable programmable read-only memory (EEPROM); a flash memory; a hard disk drive; etc. The processing resource may execute instructions (i.e., programming or software code) stored on the machine readable medium to perform operations desired to be performed by the participating nodes 114. Additionally or alternatively, the processing resource may include electronic circuitry for performing the functionality described herein.

In the Blockchain network 104, some or all of the participating nodes may include a copy of a distributed ledger 116. For convenience of representation, the Blockchain ledger sub-system 112 is shown to include one copy of such distributed ledger 116. As used herein, the term "distributed ledger" may refer to a shared digital ledger that is decentralized and synchronized among the participating nodes 114 distributed across the Blockchain network 104. After a transaction is approved to be written or stored to the distributed ledger 116, the transaction is consented to by at least the majority of the participating nodes 114. The contents of the distributed ledger 116 are synchronized across all the participating nodes 114. Different types of consensus mechanisms may be implemented on the participating nodes 114 to bring in varying levels of processing requirements to achieve agreement amongst the participating nodes 114. Examples of common consensus mechanisms may include, but are not limited to, proof of work, proof of stake, proof of elapsed time, Kafka distributed streaming platform, etc. In some examples, when a new participating node is added to the Blockchain network 104, a copy of the distributed ledger 116 may be downloaded to the newly joined participating node.

In the distributed ledger 116, data are generally stored as a Blockchain of chronologically ordered, back-linked list of data blocks. A number of data blocks in the Blockchain are connected together via use of hashing. For example, when a new block is added to the Blockchain, the new block includes a hash reference such as a hash of a predecessor block. In this manner, several data blocks may be chained together to form a Blockchain and each additional block creates an additional immutable record, which collectively provide security for and validation of the entire Blockchain. This makes it difficult to retroactively alter data stored within the Blockchain without that alteration being detected. A Blockchain may include information about the participating nodes, an owner of a block and content of the block right from the first block to the most recently completed block (also referred to as a latest data block).

In some implementations, the participating nodes 114 in the Blockchain network 104 may be able to write/store transactions on the distributed ledger 116, but not verify transactions. In the example of FIG. 1, the Blockchain IoT management sub-system 110 may be operated as a verifier that verifies the decentralized identity of the Blockchain IoT device 102. In some examples, the Blockchain IoT device 102 may be registered with the Blockchain IoT management sub-system 110. In some examples, during such registration, the Blockchain IoT management sub-system 110 may provision the decentralized identity to the Blockchain IoT device 102. Also, the Blockchain IoT management sub-system 110 may store some of the decentralized identity information of the Blockchain IoT device 102 in a reference identity data 118. For instance, the reference identity data 118 may store decentralized identity of all Blockchain IoT devices registered with the Blockchain IoT management sub-system 110. By way of example, the reference identity data 118 may include a reference public key, a reference attribute, or both corresponding to each of the registered Blockchain IoT devices. The Blockchain IoT devices that are registered with the Blockchain IoT management sub-system 110 are hereinafter referred to as valid devices from which the Blockchain IoT management sub-system 110 can accept the event data.

During operation, the Blockchain IoT management sub-system 110 may receive the event data from the Blockchain IoT device 102 via the network 106. In some examples, in order to ensure that the event data are sent by a valid Blockchain IoT device, the Blockchain IoT management sub-system 110 may verify the decentralized identity contained in the received event data. In order to verify the decentralized identity, the Blockchain IoT management sub-system 110 may extract a signature from the received event data and validate the signature using the reference identity data 118. In some examples, the Blockchain IoT management sub-system 110 may validate the signature using the reference public key corresponding to the Blockchain IoT device 102. If decentralized identity of the Blockchain IoT device 102 is successfully verified, the Blockchain IoT management sub-system 110 may accept the event data received from the Blockchain IoT device 102. Alternatively, the Blockchain IoT management sub-system 110 may reject or discard the event data received from the Blockchain IoT device 102.

In certain instances, the event data received from the Blockchain IoT device 102 may be unstructured, may include additional data that is irrelevant to a given business application or utility, and/or may contain redundant information. Therefore, upon successful verification of the decentralized identity of the Blockchain IoT device 102, the Blockchain IoT management sub-system 110 may process the event data received from the Blockchain IoT device 102 to generate processed event data. In some examples, to facilitate such processing of the event data, the Blockchain IoT management sub-system 110 may remove duplicate entries from the event data. Accordingly, after removal of the duplicate entries from the event data by the Blockchain IoT management sub-system 110, the resulting processed event data only include unique entries.

Further, in some other examples, to facilitate the processing of the event data, the Blockchain IoT management sub-system 110 may remove a predetermined type of information from the event data thereby retaining at least some contextual information. For instance, the Blockchain IoT management sub-system 110 may remove the predetermined type of information such as any additional information that is irrelevant to the given business application or utility. For example, if a business application requires only the location of an RFID tag to be stored in the distributed ledger 116, the Blockchain IoT management sub-system 110 may remove any data other than the location information of the RFID tag from the received event data. In another example, if the Blockchain IoT device 102 is a sensor that can sense various parameters such as a temperature, a pressure, a humidity, and a carbon dioxide content in a facility premises, the Blockchain IoT device 102 may generate event data that includes information on all of these parameters. Upon receipt of the event data from the sensor unit, and after successful verification of the decentralized identity of the sensor unit, the Blockchain IoT management sub-system 110 may remove information regarding the pressure and the carbon dioxide content from the received event data if only temperature and humidity related information are desired to be retained. Therefore, once any such irrelevant additional information is removed, the resulting processed event data may include a desired contextual information.

Furthermore, in certain examples, to facilitate the processing of the event data, the Blockchain IoT management sub-system 110 may arrange parameters contained in the event data in a predefined template, wherein the processed event data includes the event data arranged in the predefined template. By way of example, if the predefined template includes the parameters to be listed in a particular order, the Blockchain IoT management sub-system 110 may arrange the parameters in the particular order. For instance, if the predefined template requires the humidity information to be presented after the temperature information, the Blockchain IoT management sub-system 110 may arrange the humidity information after the temperature information in the processed event data. As will be appreciated, the predefined template may be selected to be any template, format, arrangement, and/or order of data as desired by the business application for storing the data in the distributed ledger 116. Although the predefined template as illustrated herein relates to an order of presenting various parameters, any type of predefined template may be chosen without limiting the scope of the present disclosure. During this process Blockchain IoT Management sub-system 110 may use the public key of the Blockchain IoT device to validate the signature of the event data, and once it creates the processed event data as per business needs it may sign the processed event data with its private key.

In the example of FIG. 1, the Blockchain IoT management sub-system 110 is described as performing the functionalities of verifying the decentralized identity and processing the event data. In some other examples, while the Blockchain IoT management sub-system 110 may perform one of the two functionalities (e.g., processing the event data), the remaining other functionality (e.g., verifying the decentralized identity) may be performed by a different participating node (e.g., one of the additional participating nodes 114 or the Blockchain ledger sub-system 112), without limiting the scope of the present disclosure.

In accordance with some aspects of the present disclosure, the Blockchain IoT management sub-system 110 may communicate the processed event data to the Blockchain ledger sub-system 112. The Blockchain ledger sub-system 112 may need to verify the processed event data for it to be stored in the distributed ledger 116. In some examples, the Blockchain ledger sub-system 112 may perform an authorization check for the one or both of the Blockchain IoT device 102 or the Blockchain IoT management sub-system 110 based on the identities of the Blockchain IoT device 102 or the Blockchain IoT management sub-system 110, and parameters contained in the processed event data. In some examples, the Blockchain ledger sub-system 112 may perform such authorization check to select a function (hereinafter referred to as a smart contract function) of a smart contract 120 corresponding to one or more of the Blockchain IoT device 102, the Blockchain IoT management sub-system 110, and the parameters contained in the processed event data.

In some examples, the Blockchain ledger sub-system 112 may use identity information stored in a Blockchain identity 122 to perform the authorization of the Blockchain IoT device 102 and the Blockchain IoT management sub-system 110. The Blockchain identity 122 may include identity information (i.e., decentralized identities) corresponding to all devices, parties, and systems that can communicate with the Blockchain ledger sub-system 122. In some examples, the reference identity data 118 stored in the Blockchain IoT management sub-system 110 may provide reference to the identity information stored in the Blockchain ledger sub-system 122. In certain other examples, the reference identity data 118 may be downloaded by the Blockchain IoT management sub-system 110 from the Blockchain identity 122. As previously noted, the identity information such as the decentralized identity may also include attributes corresponding to a given device.

For a particular Blockchain IoT device, in a given context, only certain parameters may be expected in the processed event data. For example, if an RFID scanner associated with an airport-A, scans RFID tags associated with an airport-B, an event data from the RFID scanner may be rejected. When the RFID scanner reports correct and relevant attribute with right digital signature, based in the attributes, corresponding processed event data may be considered for further processing by the Blockchain ledger sub-system 112. During the authorization check, the Blockchain ledger sub-system 112 may authorize the Blockchain IoT device 102 and the Blockchain IoT management sub-system 110 for certain context applicable thereto. For example, a Blockchain IoT device may be authorized for use in scanning RFID tags located in a given facility premises (e.g., the paint shop of an automobile factory) and not authorized for use in other facility premise (e.g., a robotic welding area of the automobile factory). In such a scenario, if such Blockchain IoT device is used to scan an RFID tag in the unauthorized premise, the Blockchain ledger sub-system 112 may disqualify the processed event data containing the event data generated by such Blockchain IoT device based on scanning of the RFID tag in the unauthorized premise. In another example, if the Blockchain IoT management sub-system 110 submits a processed event data pertaining to a Blockchain IoT device for which the Blockchain IoT management sub-system 110 is not authorized, the Blockchain ledger sub-system 112 may disqualify such processed event data from being stored in the distributed ledger 116.

Moreover, the Blockchain ledger sub-system 112 may allow the receipt of the processed event data from a Blockchain IoT management sub-system or the Blockchain IoT device that are authorized for a given context. For example, if a Blockchain IoT device is authorized for use in scanning RFID tags located in the paint shop of the automobile factory, the Blockchain ledger sub-system 112 may authorize such a Blockchain IoT device if associated processed event data corresponds to the paint shop of the automobile factory.

As noted earlier, the Blockchain ledger sub-system 112 may perform such an authorization check to select the smart contract function, where the smart contract 120 corresponds to one or more of one or more of the Blockchain IoT device 102, the Blockchain IoT management sub-system 110, and the parameters contained in the processed event data. The term "smart contract" as used herein may refer to processor-executable code residing in a Blockchain network such as the Blockchain network 104. The smart contract 120 automates execution of transactions between trusted parties (i.e., parties that have proved their credentials) based on processor executable contract terms. Transactions that happen via the smart contract 120 are processed on the Blockchain network 104, without any intermediator. In the present scenario, in some examples, the smart contract 120 may include various program instructions—execution of which may verify if the processed event data received from the Blockchain IoT management sub-system 110 meets a desired criteria. In some examples, the processed event data may include values of one or more parameters. The desired criteria may require the values of such parameters being in a corresponding predetermined range, the values of the parameters being lower than a corresponding minimum threshold values, or the values of the parameters being higher than a corresponding maximum threshold values. In some examples, the smart contract 120 may include smart contract functions for various businesses and business contexts that are agreed upon by all the participating nodes 110, 112, and 114 of the Blockchain network 104.

In some examples, the Blockchain ledger sub-system 112 may select a smart contract function relevant to one or more of the Blockchain IoT device 102, the Blockchain IoT management sub-system 110, or parameters contained in the processed event data. Further, the Blockchain ledger sub-system 206 may execute the selected smart contract function, thereby performing the verification of the processed event data for proceeding to store the event data in the distributed ledger 116.

Upon successful verification of the processed event data as noted hereinabove, the Blockchain ledger sub-system 112 may store the processed event data in a distributed ledger 116. In some examples, the Blockchain ledger sub-system 112 may require consent from all or at least a majority of the participating nodes 110, 112, 114 for storing the processed event data in the distributed ledger 116. For example, upon successful verification of the processed event data, the Blockchain ledger sub-system 112 may determine whether consensus for storing the processed event data was reached among participating nodes 110, 112, 114 in the Blockchain network 104. Different types of consensus mechanisms or programs may be used by the participating nodes 110, 112, 114 to implement varying levels of processing requirements to agree on a transaction (e.g., a request for storing the processed event data in the present example) amongst the participating nodes 110, 112, and 114 in the Blockchain network 104. Examples of the consensus mechanisms may include, but are not limited to, proof of work, proof of stake, proof of elapsed time, or Kafka.

Upon successful consensus among the participating nodes 114, the Blockchain ledger sub-system 112 may store the processed event data as a record or block in the distributed ledger 116. In some examples, the Blockchain ledger sub-system 112 may store the processed event data in the distributed ledger 116 along with a verifiable claim 131 or verifiable credentials associated with the Blockchain ledger sub-system 112 to prove that the Blockchain ledger sub-system 112 possesses verifiable credentials with certain characteristics.

In some examples, the information in the processed event data to be stored in the Blockchain may include contents related to the processed event data, a cryptographic hash value of the content of the processed event data, a metadata corresponding to the processed event data, a cryptographic hash value of the metadata, or combinations thereof. Data blocks in the Blockchain are connected together via use of hashing. For example, when a new block is added to the Blockchain, the new block includes a hash reference such as a hash of a predecessor block. In this manner, the several data blocks may be chained together to form a Blockchain and each additional block creates additional security for a validity of the entire Blockchain. This makes it difficult to retroactively alter data stored within the Blockchain without that alteration being detected. A Blockchain has complete information about the participating nodes, an owner of a block and content of the block right from the first block to the most recently completed block (also referred to as a latest data block). Accordingly, a Blockchain provides high security and has a lower probability of being breached unnoticed.

The Blockchain verifiable claim sub-system 130 is configured to create, validate, and submit a specific type of data on the Blockchain IoT system 100, namely verifiable claims 131. FIG. 1 illustrates the verifiable claim sub-system 112 as storing and managing verifiable claims 131 (or verifiable credentials), allowing the verifiable claim sub-system 112 to control transactions and execution of smart contract 120 with respect to a certain context (as defined by the verifiable claim). Additionally, the verifiable claim sub-system 130 is configured to perform the techniques used to validate, create, and deployed verifiable claims 131, as disclosed herein. In particular, the verifiable claims 131 and information relating to the creation, validation, and deployment of the verifiable claims 131 may be stored as a block in a Blockchain of chronologically ordered, back-linked list of data blocks.

Generally, a verifiable claim is a statement that ties a subject to a particular context. Similarly, the verifiable claims 131 in the verifiable claim sub-system 130 can be defined such that a physical asset, such as Blockchain IoT device 102, is tied to a particular context for participating in a transaction. For instance, in retail transactions, age requirements may be in place in order to restrict the purchase some items (e.g., tobacco or alcohol). In this case, completing the transaction is predicated on the purchaser providing proof to the retailer that they are a person who is of age (e.g., older than the minimum age requirement). In an example where the transaction uses verifiable claims for verifying the age requirement, the purchaser would only be required to provide a verifiable claim that their age meets the age requirement. According to the disclosed verifiable claim techniques, the purchaser could use a Blockchain IoT device 102 to issue a digital proof of a verifiable claim, for example "I am at least 18 years old" to a nearby RFID scanner at the retailer during the transaction. The retailer would then be able to contact the smart contract 120 on the Blockchain network 104, in order to ultimately validate the provided proof of the verifiable claim 130 from the purchaser. In response to validating proof of the verifiable claims 130, which involves verifying that the purchaser is indeed over 18 years old, then the transaction between the purchaser and the retailer would be allowed to proceed based on the context of the age requirement.

By using a verifiable claim for this transaction, only the information that requires verification (e.g., age of the purchaser) is presented, providing a context (e.g., older than 18) for the user of that asset on the Blockchain network 104. In contrast, if the purchaser presented a driver's license for verifying the age requirement of the transaction, the driver's license would bear the purchaser's Date of Birth (DOB) which can be used to verify whether the purchaser is over 18, for example. Nonetheless, the driver's license would also bear additional personally identifiable information about the purchaser that is not required by the validator (e.g., retailer) for the transaction, such as an address, driver's license number, etc. As a consequence, the retailer may capture additional information (e.g., not needed for age verification) that the purchaser may not explicitly grant permission for them to access. Employing the verifiable claims 130 can provide privacy protection, for example by abstracting away the actual identity of a user and other information, and providing digital proof of data that is particularly pertinent to the context of the transaction.

According to the embodiments, the verifiable claims 131 are communicated via the Blockchain network 104, and can be maintained on the distributed ledger 116. With verifiable claims 131 on the distributed ledger 116, the claims are accessible to other participating nodes 114 on the Blockchain and/or other Blockchain IoT devices (not shown). Furthermore, as will be described in further detail, the disclosed techniques allow verifiable claims 131 to be used by physical devices, such as Blockchain IoT device 102, that are deployed in the digital world, extending their application beyond digital assets. Moreover, the disclosed techniques support automating the process of validating the existing verifiable claims 131 on the Blockchain network 104, as well as creating new verifiable claims in the Blockchain IoT system 100.

According to the embodiments, verifiable claim sub-system 130 is configured to integrate the use of verifiable claims 131 (e.g., predominately used in Blockchain environments) and hardware RoT 103 (e.g., predominately used in IoT environments) in a robust manner. This allows for verifiable claims 131 to be used with devices in the physical world. As illustrated in FIG. 1, a RoT 103 can be embedded on the hardware of the physical asset, which can be used for creating (and subsequently validating) verifiable claims 131 in the Blockchain. Leveraging RoT 103 (which is directly tied the physical asset itself) to be a building block for verifiable claims is a unique concept that is not currently applied to existing Blockchain or IoT applications. That is, executing a "proof" of RoT 103 for the devices in the Blockchain IoT system 100 ultimately leads to achieving automation in validating trust between devices that are commonly untrusted (e.g., unsecure IoT ecosystem). As alluded to above, there are typically challenges regarding trustability, considering the plethora of devices that may be within an IoT ecosystem. As will be discussed in greater detail in reference to FIG. 1, the "things" in the Internet-of-Things may refer to a wide variety of sensor and other electronic devices, such as heart monitoring implants, biochip transponders embedded in farm animals, automobiles with built-in sensors, smart lights, and smart thermostat systems that may allow remote monitoring. It is expected that IoT systems may grow to include billions of devices. Accordingly, it is difficult to ensure and maintain trust with such a vast amount and differing types of devices. Nonetheless, by means of utilizing the RoT 103 and establishing a proof of RoT between devices involved in an interaction, a verification process for issued verifiable claims 131 can be automated. In a system where the number of sensors used is on the order of millions of devices, automation of any approach is invaluable. Hence, implementing trustability within the disclosed Blockchain IoT system 100 in a manner that is automated and robust realizes several advantages over current systems.

Additionally, the Blockchain IoT system 100 can include a distributed entity provisioning sub-system 140. As a general description, the distributed entity provisioning sub-system 140 acts as a distributed entity and access management solution for the system 100. As such, autonomous transactions between participants, such as Blockchain IoT devices, on the Blockchain IoT system 100 are simplified. The decentralized capabilities of the distributed identity provisioning sub-system 140 are an advancement over conventional centralized systems, in which zero trust provisioning and identity/access management are accomplished by a single central authority. This type of dependency on a single centralized entity has drawbacks, for instance being susceptible to single points of failure. In contrast, via distributed identity provisioning, the distributed identity provisioning sub-system 140 enables the identity and attributes of a Blockchain IoT device 102 to be announced throughout the ecosystem, for instance to other Blockchain IoT device and system components that are within the system 100. By using decentralized identity and verifiable claims, this provisioning functionality allows constrained devices to securely participate in autonomous communications. Also, the distributed entity provisioning sub-system 140 enables attributes originating from a device, such as the Blockchain IoT device 102, to be communicated throughout the ecosystem using a constrained protocol (such as OPC-UA or equivalent) in a manner that can prevent misuse of the created identity (by a guardian). Moreover, the distributed identity provisioning sub-system 140 allows assets, for instance Blockchain IoT device 102, to autonomously establish a provisioned identity, and to further use this provisioned identity for future transactions. For example, Blockchain IoT device can autonomously establish a provisioned identity that it is allowed to share throughout the system 100 subsequent to verifying a "proof" of provisioning the identify on the Blockchain network 104 (vis-à-vis the distributed ledger 116). A trusted signing of a successfully provisioned identity, by the distributed entity provisioning sub-system 140, can serve as the "proof" of provisioning the identify.

As illustrated in FIG. 1, the various capabilities of the distributed identity provisioning sub-system 140 include, but are not limited to: generating and provisioning identities of Blockchain IoT devices (without a dependency on a single central entity); maintaining a decentralized access control list (for users and devices), that supports the interoperability between multiple untrusted parties; and updating and revoking access to specific identities. In conventional centralized systems, as alluded to above, authentication requests and data associated with users and devices are primarily managed by the central entity. However, the distributed identity provisioning sub-system 140 can overcome some of the limitations encountered by centralization, thereby expanding its applicability and viability in various practical applications. For example, the distributed identity and access management techniques can be used in applications including, but not limited to: the creation and provisioning of identity for aerospace and defense asset tracking solutions; and the creation and provisioning of identity for a drone using hardware security module, trusted platform module, or trusted execution environment to enable autonomous logistics, delivery, and payment.

In the example of FIG. 1, the functionalities of verification of the decentralized identity, processing of the event data, verification of the processed event data, and storage of the processed event data are shown to be performed by different participating nodes 114. As will be appreciated, the operations performed by the Blockchain IoT management sub-system 110, the Blockchain ledger sub-system 112, and the verifiable claim sub-system 130 may also be performed on a single participating node without limiting the scope of the present disclosure.

The Blockchain IoT device 102, in accordance with some aspects of the present disclosure, is registered with the Blockchain IoT management sub-system 110 and is provisioned the decentralized identity from the Blockchain IoT management sub-system 110. Therefore, once the decentralized identity in the event data received from such Blockchain IoT device 102 is verified, the Blockchain IoT device 102 may be considered trusted and the event data can be accepted for further processing. Moreover, the Blockchain IoT management sub-system 110 in the proposed Blockchain network 104, in accordance with some aspects of the present disclosure, processes the received event data to generate the processed event data. Various processing that are performed by the Blockchain IoT management sub-system 110 may include removing duplicate entries from the event data, and/or arranging parameters contained in the event data in a predefined template, and/or removing a predetermined type of information from the event data thereby retaining at least some contextual information of the event data. Accordingly, the proposed solution facilitates relevant and structured data in the Blockchain network for storage into the distributed ledger 116.

Figure 2:
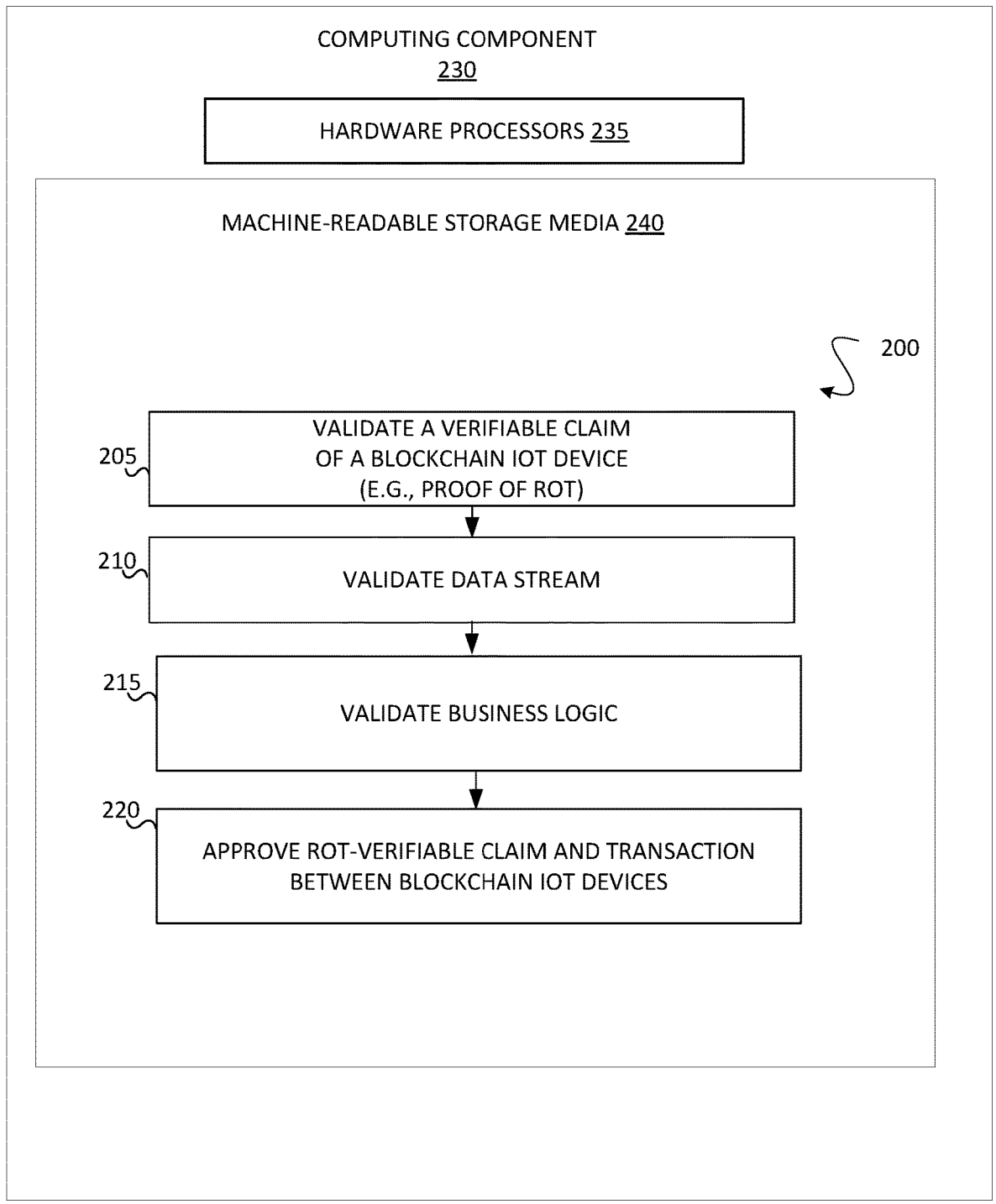
FIG. 2 is an operational flow diagram illustrating an example of a process for implementing verifiable claims for use with physical assets, according to some embodiments.

Referring now to FIG. 2, an example of a process 200 for implementing verifiable claims for physical assets, as described herein, is shown. The process can involve physical assets, such as a Blockchain IoT devices (shown in FIG. 1), which are attempting to conduct a transaction in a commonly untrusted IoT system. In the transaction, a Blockchain IoT device can provide a data stream, and a verifiable claim that is tied to the physical asset via RoT technology (thereby referred to herein as an RoT-verifiable claim) that is used to approve sharing of the data stream. In some embodiments, an Oracle service can be used to validate inbound and outbound IoT traffic. Additionally, as described in reference to FIG. 1, the process 200 can be performed in an environment having an identity layer for IoT devices and a Blockchain layer for managing the transactions and verifiable claims of participants. As an example, a physical asset can have a verifiable claim from customs, which allows this physical asset to further be issued a verifiable claim from a warehouse (irrespective of its presence). Also, it may be required that the physical asset be delivered by the right entity, and under proper conditions (monitored by telemetry tags). In this example, the process 200 can validate the identity and attribute of the physical asset, in addition to validating the recorded conditions of existing provenance, which ultimately can be used to issue a new provenance verifiable claim.

According to an embodiment, the process 200 can be performed by a sub-system on the Blockchain network (shown in FIG. 1). Accordingly, process 200 is illustrated as a series of executable operations stored in a machine-readable storage media 240, and being performed by hardware processors 235 in a computing component 230. Hardware processors 235 execute the operations of process 200, thereby implementing the disclosed verifiable claims techniques described herein. The process 200 is illustrated as having three principal validation operations 205, 210, and 215. Each of the validation operations 205, 210, and 215 represent a level in the validation process that can be used with a decentralized identity, asset attributes, and verifiable claims. As a general description, operation 205 is the verifiable claim validation level, operation 210 is the data stream validation level, and operation 220 is the business logic validation level.

At operation 205, the RoT-verifiable claim of a physical asset, namely a Blockchain IoT device, is validated. Many existing IoT systems use DID as the source of distributed identity for RoT devices. However, as alluded to above, the disclosed techniques connect data from RoT devices and convert them to verifiable claims, which subsequently can be validated. Validating the RoT-verifiable claim can involve verifying a digital certificate that is presented by the physical asset. By ensuring the validity of the RoT-verifiable claim, a "proof" of RoT is essentially generated. Then, after the verifiable claim is validated, the process 200 proceeds to operation 210, where the physical asset begins to provide a data stream in an interaction (e.g., IoT interaction between a RFID tag and RFID scanner). The process 200 validates this data in operation 210. Validating the data stream can be accomplished by various means, such as using Blockchain based identity, RoT mechanisms, and security mechanisms. For example, the data steam can be "stamped" with a signed proof of RoT on the Blockchain, resulting from operation 205. This proof of RoT can be used for validating the data stream in operation 210. A data stream can include a signature that is based on the proof of RoT. Then, operation 210 can validate this signature in order to determine that the data stream is also valid. Operation 210 can also involve validating the data attributes of the data stream, which can indicate the monitored conditions of the physical asset. Validating data attributes relating to the physical asset ensures that the physical asset is under the proper conditions for conducting the transaction (e.g., delivered under to a warehouse under the proper conditions).

Thereafter, the data resulting from operations 205 and 210 can be executed via a smart contract on the Blockchain to validate a business logic in operation 215. The business logic can be considered criteria that governs the business aspects of the interaction, which need to be satisfied in order to approve the transaction. In response to validating the business logic in operation 215, the process 200 successfully traverses each of the validation levels. Accordingly, the process 200 can approve the verifiable claim and conduct the transaction in operation 220. By implementing process 200, the physical asset is enabled to prove ownership of its verifiable claim in a physical word, along with ownership, attributes, and compliance without needing a centralized identity. Furthermore, it should be appreciated that process 200 is an automated process, where each of the operations 205-220 can be initiated and executed without requiring human interaction or intervention.

Figure 3A:
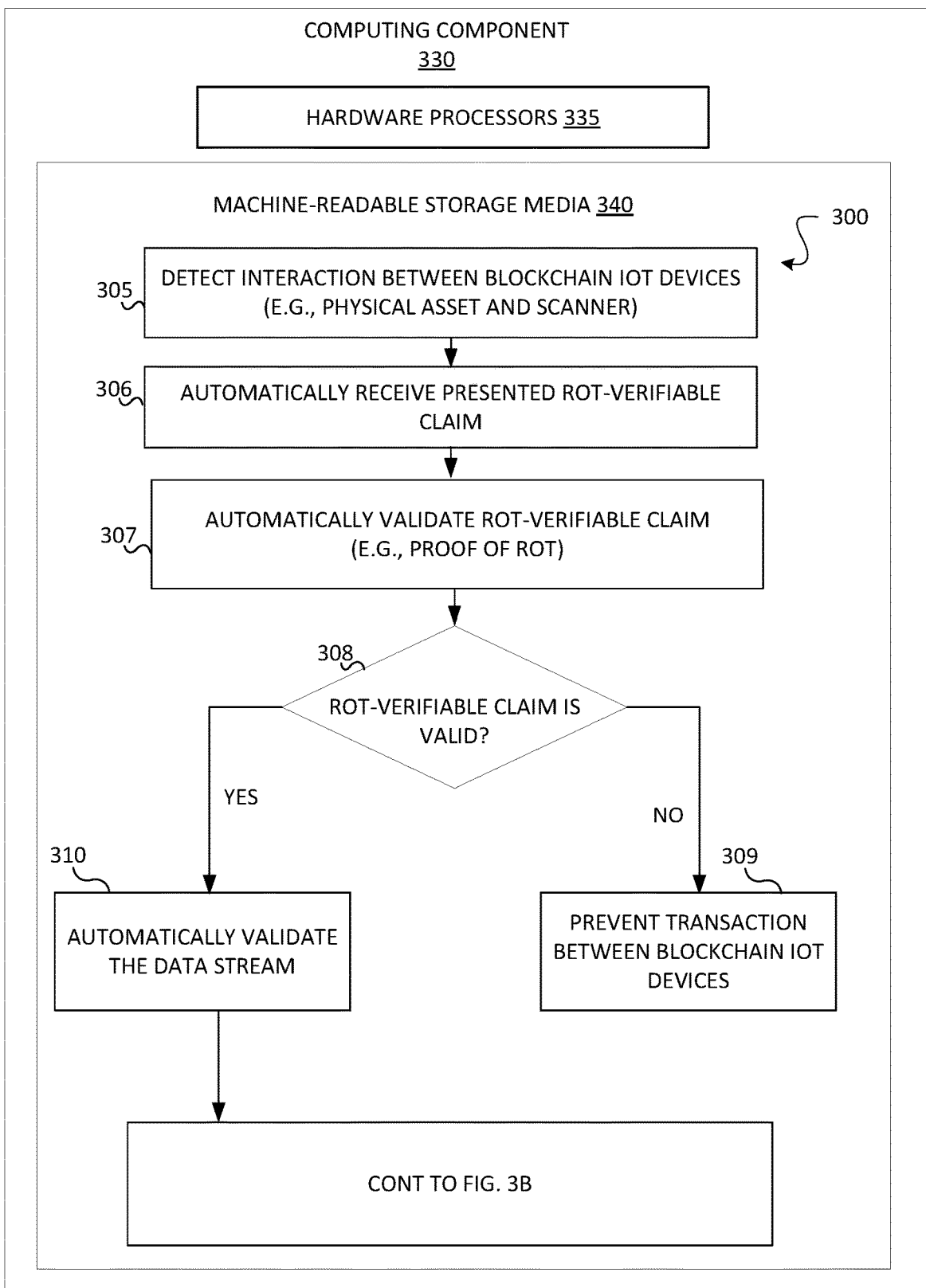
FIGS. 3A-3C are operational flow diagrams illustrating an example of a process for executing a transaction between Blockchain IoT devices using RoT-based verifiable claims, according to some embodiments.
Figure 3B:
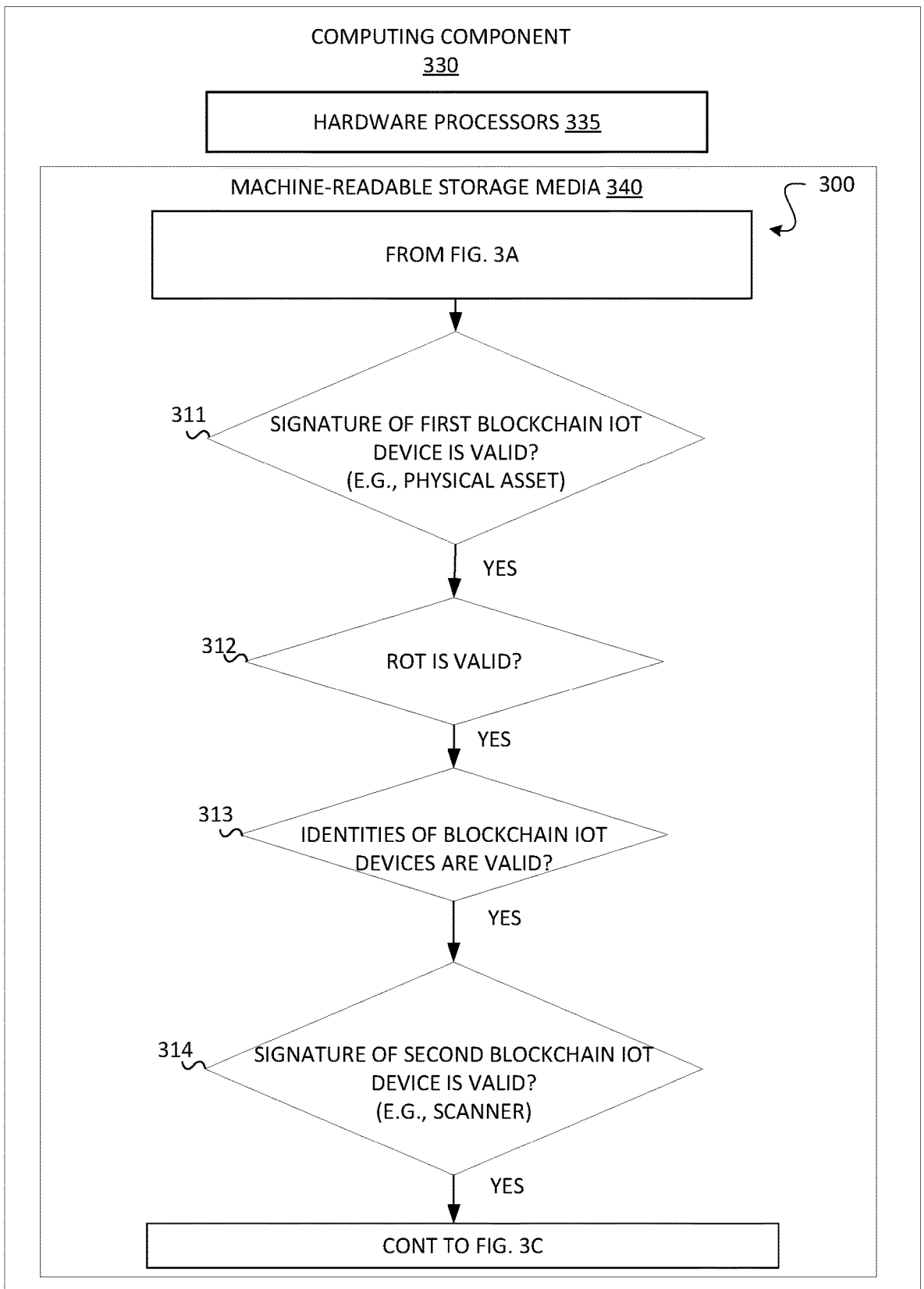
Figure 3C:
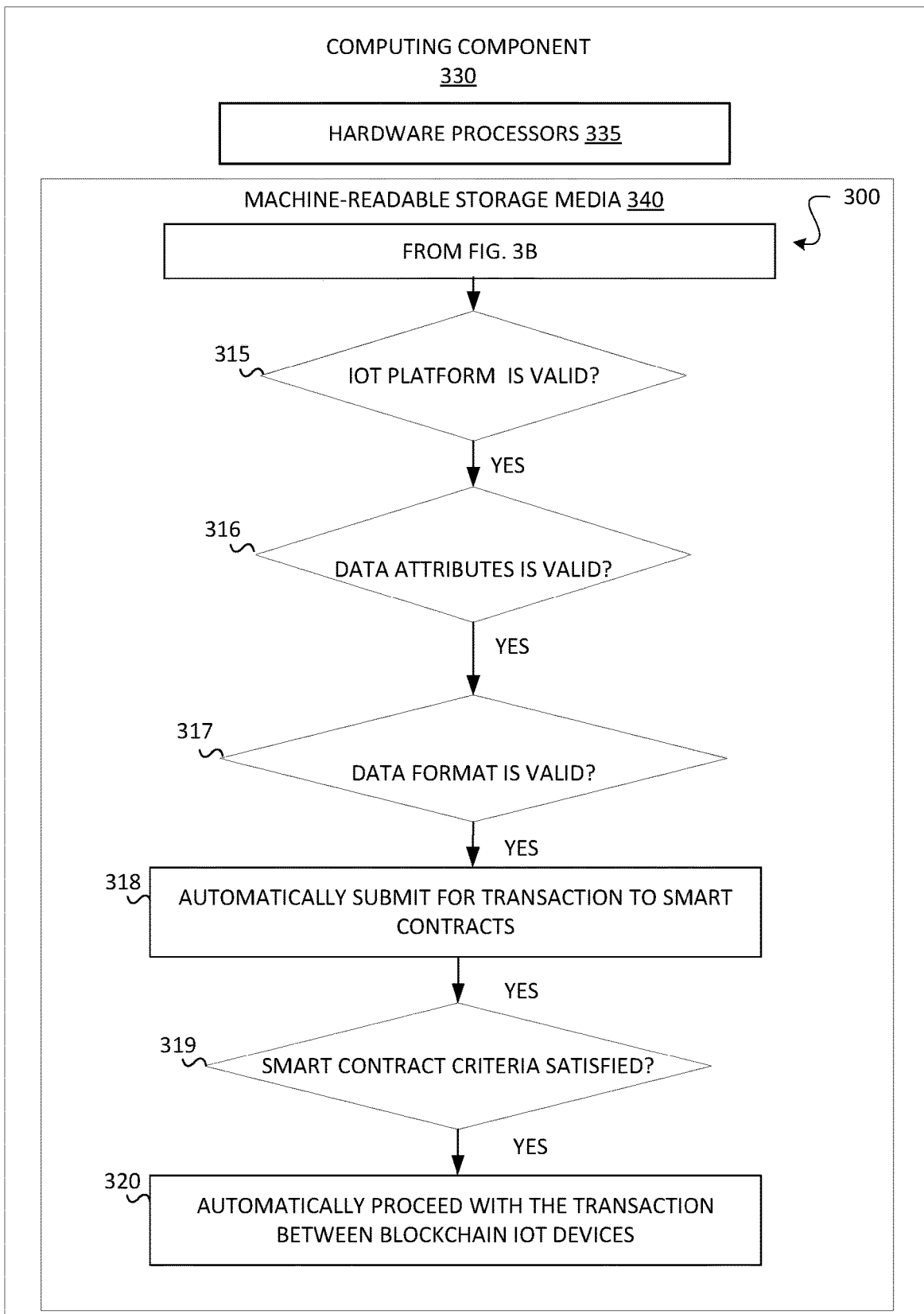

FIGS. 3A-3C illustrate an example of a process 300 for implementing verifiable claims for physical assets, as described herein. Generally, process 300 is an example of a more detailed procedure that can implement the overall functionality of the process described in FIG. 2. As mentioned above, adapting verifiable claims for use with physical assets can be useful in a number of different practical applications. One such application can involve RFID scanners tracking movement of a critical asset that may be integrated with an automated global supply chain. For example, an RFID scanner device can be connected to the Blockchain IoT system (shown in FIG. 1). Further, a high value asset, such as a donor organ (in a medical based example) may pass by this RFID scanner while it is being transported, for instance in route to a hospital (for a subsequent transplant). During transport, it may be required that the donor organ be maintained according to a certain set of criteria that are governed by safety and medical standards (e.g., adequate conditions for transporting a donor organ). For instance, standards may require that the organ be maintained at a certain temperature (e.g., $-25°$ C.) in order for the organ to be viable upon reaching the destination hospital. In some cases, the organ must be tested and the safety criteria verified prior to allowing the organ to be received by the destination hospital, or accepted at another location for storage. In this example, IoT sensors (implemented as a Blockchain IoT device shown in FIG. 1) can be used to track and report the status of the organ. In some instances, as the organ (or physical asset) moves along the transport route, it may be locally validated at various different points prior to reaching the destination hospital. If the organ is temporarily stored at an organ storage center, an RFID scanner can interact with the IoT sensors on the refrigeration box, initiating process 300 for dynamically validating the organ at that particular location. Thus, if the organ was tampered with or fails to be maintained at the required conditions, then these events would be captured by the local validity check of the verifiable claim and maintained by the Blockchain. Thus, a validation of the verifiable claim at any subsequent location on the route would be able to access the Blockchain to obtain the previous status of the organ. As each location checks the status of the organ at the prior location, respectively, it can be determined whether the organ was maintained at the required conditions throughout its transport (e.g., temperature being over $-25°$ C. at any point may damage the organ and/or ruin its viability). As a result, even if the organ fails to validate its verifiable claim at only a single local validation point (being validated at all other locations), the destination hospital has grounds to reasonably reject the organ.

Temperature sensors may be affixed to a refrigeration box housing the organ, for example, to detect its current temperature (e.g., temperature at which the organ is being maintained). Furthermore, the refrigeration box can include a hardware RoT integrated into its hardware in a manner that allows verifiable claims to be tied to the physical asset. For example, the IoT sensors at the refrigeration box can include specially allocated memory for storing information that is tamper proof. Consequently, verifiable claims can be provisioned into the hardware RoT of the physical asset, namely the donor organ (vis-à-vis the refrigeration box). A verifiable claim of "temperature is less than $-25°$ C." may be used in this organ example. When the RoT model boots up, enabling its function, the IoT sensor can share the verifiable claim (also referred to herein as RoT verifiable claim) via the Blockchain. Subsequently, this RoT-verifiable claim can be validated through the Blockchain in a manner that allows a degree of trust during the transaction between IoT sensors that correspond to the physical asset and the RFID scanner. For purposes of discussion, the process 300 will be described in reference to the abovementioned practical example. Additionally, it should be understood that the IoT devices involved in the process 300 are implemented as Blockchain IoT devices (shown in FIG. 1), and thereby have Blockchain-enabled capabilities.

In general, process 300 can be described as a multi-level validation process, which utilizes decentralized identity, asset attributes, and verifiable claims. Particularly, FIGS. 3A-3C illustrate an example of the process 300 for implementing autonomous validation and creation of RoT-verifiable claims for physical assets. According to an embodiment of the systems and methods described herein, the process 300 can be performed by a sub-system on the Blockchain network (shown in FIG. 1). Accordingly, process 300 is illustrated as a series of executable operations stored in a machine-readable storage media 340, and being performed by hardware processors 335 in a computing component 330. Hardware processors 335 execute the operations of process 300, thereby implementing the disclosed RoT-verifiable claims techniques described herein.

Process 300 can begin at operation 305, where the initiation of an interaction is detected between Blockchain IoT devices. In most cases, the interaction involves two Blockchain IoT devices, which can be generally described as a transmitter (e.g., sending data) and a receiver (e.g., receiving data). However, it should be understood that interactions can include multiple devices, for example in a broadcast or multicast communication. A Blockchain IoT device is a physical asset that is associated with an RoT-verifiable claim that must be validated prior to allowing the IoT devices to proceed with a transaction. Referring back to the example, the interaction detected in 305 can be the RFID scanner at a human organ storage location detecting an IoT sensor in a refrigeration box that is housing the organ while it is being transported. As alluded to above, once the refrigeration box is received by a new location, its verifiable claims can be locally validated with respect to that particular location. Accordingly, in this case, the verifiable claim would be continuously maintained by the Blockchain for the duration while the organ is transported to its destination hospital.

In response to interaction at operation 305, the RoT-verifiable claim is presented by the Blockchain IoT device that is to be validated, also referred to as the requesting device. As previously described, by leveraging RoT technology, the RoT-verifiable claim can be linked (e.g., embedded on) to a physical asset, namely the Blockchain IoT device (e.g., requesting device). The Blockchain IoT device has the capability to communicate this RoT-verifiable claim to other Blockchain IoT devices, including the Blockchain IoT gateways, PoS machines enabled with Blockchain, asset tracking devices, IoT devices allowing physical access, etc. Thereafter, the process 300 proceeds to operation 307, where the RoT-verifiable claim is automatically validated. Operation can include obtaining RoT data from the Blockchain IoT devices and converting them into verifiable claims, hence the reference to RoT-verifiable claims. The Blockchain IoT device that is performing the validation, also referred to as the validating device, can check the Blockchain to obtain the validity of the presented RoT-verifiable claim. In accordance with the embodiments, the RoT-verifiable claims are verified in a decentralized manner by the Blockchain. For instance, the validating device can determine whether the RoT-verifiable claim is a valid representation of a digital certificate that has been originally issued to the requesting device. In other words, once a digital certificate is issued to a Blockchain IoT device, it is represented across the distributed ledger of the Blockchain allowing it to be obtained, and subsequently validated, by any other Blockchain IoT device in the ecosystem having accessibility to the Blockchain. Thus, the validating device can check with the Blockchain to determine whether the digital certificate associated with the RoT of the requesting device is valid, thereby indicating that the RoT-verifiable claim of the requesting device is correct and legitimate. In some cases, operation 307 can include accessing a smart contact for verifiable claims to determine user privilege, so as to determine whether the presented RoT-verifiable claim has privileges to provide the information (e.g., event data, status, etc.). In reference to the example, the RFID scanner is Blockchain-enabled, allowing it to check the Blockchain to determine whether the verifiable claim of "temperature is less than −25° C.".

Moreover, it should be appreciated that the validation of the RoT-verifiable claim is performed in an automated fashion. RoT and Blockchain are integrated in a unique manner in order to achieve this automation of trust (and handling of verifiable claims) between untrusted parties. As alluded to above, many existing systems that involve predominantly untrusted devices, for example in an IoT ecosystem, do not lend themselves to automated verification processes. Nonetheless, process 300 leverages RoT, allowing the verification process for issued verifiable claims to be automated.

Subsequently, at operation 308, the check is performed to determine whether the presented RoT-verifiable claim from the requesting device is valid. In the scenario where the RoT-verifiable claim fails validation ("No") in response to the check at 308, then the process 300 moves to the branch leading to operation 309. When the RoT-verifiable claim is not validated, it can signify that there are issues with the trustability of the physical asset (e.g., requesting device). An RoT-verifiable claim may fail its validation check due to a number of issues existing, which can include but are not limited to: the information provided by the physical asset is outside of the approved context (or criteria); data being corrupted and/or tampered with (e.g., connectivity issues, security threats); and the device is not trusted (e.g., not associated with the proper digital certificate). Operation 309 can cause any transaction attempts between the Blockchain IoT devices (e.g., requesting device and validating device) to be prohibited, as a result of a failed validation in previous operation 308. Referring again to the practical example, in the event that the temperature sensor of the refrigeration box senses a temperature of −10° C., then the RoT-verifiable claim of being continuously maintained at a temperature below −25° C. would fail to validate. Additionally, operation 309 can involve creating a rejection certificate on the Blockchain, causing an immutable record that the presented RoT-verifiable claim from the Blockchain IoT device (e.g., requesting device) was invalid. Consequently, the Blockchain maintains a type of validation history for the Blockchain IoT device, including records from previous validation checks relating to the device's verifiable claims. Other Blockchain IoT devices can obtain this history from the Blockchain in subsequent transactions, allowing them to have an awareness of any failed or successful validations of RoT-verifiable claims for a particular device. For instance, in some embodiments, a transaction may be prohibited if there is any record of a failed validation (e.g., rejection certificate) for the Blockchain IoT device (participating in the transaction) on the Blockchain.

In some embodiments, a Blockchain IoT device can be configured to automatically perform an action at operation 309, such as outputting an audio (e.g., audible tone), tactile (e.g., vibrate), or visual alert (e.g., flashing lights) indicating that the RoT-verifiable claim has not been successfully verified.

Conversely, in a scenario in which the RoT-verifiable claim is successfully validated ("Yes") in response to the check at 308, then the process 300 moves to the branch leading to operation 310. Determining a successful validation at operation 308 serves to establish a proof of the RoT. In other words, only after a successful validation of the RoT-verifiable claim from the Blockchain IoT device (e.g., requesting device), are any subsequent transactions allowed to take place. Thus, using the decentralized proof of RoT on the Blockchain can be used as the verifiable claim, further to create, validate, and transact though context-based control (and execution) of smart contracts.

At operation 310, the process 300 begins to automatically validate the data stream that is provided by the physical asset, namely the Blockchain IoT device (e.g., requesting device) that may be used in the transaction. That is, the process 300 ensures that the device is trusted and that the required context is satisfied, by validating the RoT-verifiable claim in operation 308. Only then is the transfer of data relating to the transaction from the trusted device allowed to occur. Additionally, the process 300 includes another layer of security by validating the data stream itself. As a general description, data communicated from the Blockchain IoT device can be signed with the proof of RoT on the Blockchain, which can then be used for validation of the data. Data that are validated by operation 310 can include event data, status data, identification data, and the like.

Operation 310 can involve passing data from the Blockchain IoT device to the smart contracts on the Blockchain, in order to perform the subsequent validation of the data. Referring again to the example, the IoT sensor on the refrigeration box can transmit data indicating: "I have been maintained at −25° C." for contextual validation; and "This is my identity TAGID" for identification verification." This can be considered the data stream that is transmitted from the IoT sensor and subsequently received by the RFID scanner. The data stream can be also be communicated to the smart contract on the Blockchain. Then, in response to receiving the data stream via the Blockchain, the smart contract can automatically begin validation of this data stream.

Referring now to FIG. 3B, the process 300 can continue to operation 311 which is the first in a series of checks that may be involved in validating the data stream. Operation 311 can include determining whether the signature is valid, thereby indicating that the secure information is valid. In particular, operation 311 can check if the data stream is signed by the same signing party that originally issued the signature to the physical asset. The signing party can be any appropriate authority associated with the physical asset, which is a Blockchain IoT device in this case. In reference to the example, the signing party can be the hospital from which the organ originated (e.g., donor's hospital). Often times, the signature is assigned to the physical asset by the corresponding signing party prior to process 300 (e.g., at deployment). Also, the identity of the original signing party is maintained in the Blockchain in a decentralized and distributed manner. Thus, by accessing the appropriate records in the Blockchain, the signature of the signing party that originally issued the signature can be obtained, and subsequently compared to a signing party for the current signature. As a result, operation 311 can prove that the data stream has been signed by the proper signing party, and further that the signature is valid. If the signature is determined to be valid ("Yes") by operation 311, then the process continues to operation 312.

Next, at operation 312, a check determines whether the RoT presented by the Blockchain IoT device (e.g., requesting device) is valid. In general, the RoT is considered valid if there is no evidence that the RoT has been altered, tampered, or otherwise modified. For example, if there is any substantive change detected in the RoT, suggesting that there may have been tampering, then the process 300 is stopped and the physical asset would be rejected (recorded by the Blockchain). In some embodiments, an RoT that is determined to be invalid causes the trigger of an alert. The process 300 requires that the RoT is proven to be valid, or untampered, in order for the process 300 to proceed (and for the transaction to ultimately complete). Upon determining that the RoT is valid ("Yes") at operation 312, the process continues to operation 313.

Thereafter, the process 300 performs checks for the identities of both Blockchain IoT devices that are involved in the integration, and potentially the transaction (e.g., requesting device, validating device). Referring back to the example, the interaction involves an IoT sensor and an RFID scanner. In this example, the process 300 verifies that the identity of the IoT sensor and the identity of the RFID scanner are valid before a transaction is allowed between these devices. Operation 313 performs a check to ensure that the identity of the physical asset, which is the IoT sensor in the example, is valid. In detail, operation 313 can determine whether the identity of the physical asset transmitting the data stream, which is a Blockchain IoT device (e.g., requesting device), is valid. For instance, an asset tag can serve as an identifier for a corresponding physical asset, such as an IoT sensor. This asset tag can be retrieved (e.g., Bluetooth), and can then be used for validation of the physical asset's identity.

Also, operation 313 can involve performing a check to ensure the validity of the identity of the Blockchain IoT device that is interacting with the physical asset, which is the RFID scanner in the example. Accordingly, the process 300 validates the identity of the scanner that captures and reports the data from the physical asset. Verifying the identity of this Blockchain IoT device (e.g., validating device) at operation 313 can signify that the scanner is trustworthy, and in turn that the information being passed through the scanner is also likely to be trustworthy. Upon determining that the identities of the Blockchain IoT devices are valid ("Yes") at operation 313, then the process moves to operation 314.

Next, at operation 314 a check is performed to determine whether the digital signature of the Blockchain IoT device that is interacting with the physical asset, for example the RFID scanner, is valid. In many cases, the Blockchain IoT device that is interacting with the physical asset (e.g., validating device) is local to a particular IoT platform and has a digital signature that can be obtained by the Blockchain. Accordingly, the Blockchain can be accessed during operation 314 in a manner that ascertains the validity of the device's signature. If the signature is determined to be valid ("Yes") by operation 314, then the process continues to operation 315.

Thereafter, operation 315 determines whether the IoT platform is valid. As described above, data can be captured by the scanner (from the physical asset) which can then passed to the IoT platform. However, all of the data that is communicated to the IoT platform does not create a new verifiable claim. Referring to the example, the organ may stay in the same organ storage for a substantive length of time (e.g., few hours, few days). For each minute the organ stays inside of the location, its corresponding IoT sensor may be passively interrogated by the RFID scanner, and new information passed from the physical asset to the IoT platform. Nonetheless, there may not be a need to create a verifiable claim for each instance of the interrogation every minute, and for the new data that is collected therefrom. Thus, validating the IoT platform at operation 315 can include ensuring that redundant verifiable claims (e.g., digital certificates) are not created, and that redundant verification does not occur. After successfully validating the IoT platform ("Yes") at operation 315, then the process 300 proceeds.

Thereafter, at operation 316, a check is performed to determine whether data attributes are valid. An attribute's validity can be considered with respect to the presented RoT-verifiable claim. In general, if the data attributes from the physical asset are within the context defined by the RoT-verifiable claims, then the data attributes are valid. For example, operation 316 can verify, with respect to the verifiable claim of "I have been maintained at −25° C.", that subsequent temperature values received from the IoT sensor (on the refrigeration box) are all less than −25° C. Accordingly, data attributes that satisfy the verifiable claim, namely temperatures less than −25° C., are considered valid. If the data attributes are found to be valid ("Yes") by operation 316, then the process continues to operation 317.

At operation 317, a check is performed to determine whether a data format is valid. As an example, operation 317 may verify that the format in which data are obtained from the physical asset is compatible with the RoT-verifiable claim on the Blockchain. In other words, data are required to be received in the correct format (or an appropriate format) by the system, when that data impacts the validation and/or creation of verifiable claims. As a result, only data that is in a format that is deemed valid, and intelligible to the Blockchain IoT system is used for validating the verifiable claims and further for conducting transactions. In some cases, operation 317 may include preprocessing the data into the necessary format, such that the resulting data format is valid. Once the data format is determined to be valid ("Yes") by operation 317, then the process 300 continues to operation 318.

In FIG. 3C, operation 318 is reached only after each of the series of checks in operations 311-317 are successful (e.g., each inspection related to the data stream is valid). In some cases, the data stream has failed validation if there is even a single failure in the series of checks in operations 311-317. There is a potential that some data may be corrupted and/or untrustworthy, if the data stream fails to validate. Thus, a failed check in any of the operations 311-317 can cause the process 300 to return to operation 309, which prohibits the transaction from occurring between the Blockchain IoT devices (e.g., the physical asset is rejected).

Alternatively, the data stream is considered to be successfully validated, after the process 300 has successfully progressed through each of the checks in operations 311-317. With the data stream validated, the integrity and trustworthiness of the data are verified thereby ensuring that the data are suitable for further use to validate verifiable claims. In some cases, the series of checks in operations 311-317 can function in a successively aggregated manner such that the result (and related data) from a previously executed check are aggregated with data from the next check (and other successive checks) in this series. Accordingly, the process 300 can compound the verifying data from the preceding checks, which is ultimately used to validate the data stream. For example, operation 313, which validates the identity of the Blockchain IoT devices, receives the verification data related to operation 312 (immediately prior) and further from operation 311, indicating the RoT is valid and the signature of the physical asset is valid (e.g., signed by the correct signing party), respectively. It should be appreciated that executing the checks of operations 311-317 in series and in the shown order is an example for purposes of discussion, and is not intended to be limiting. Therefore, it is possible, for example, to execute the operations 311-317 in parallel and in various different orders, as deemed necessary and/or appropriate.

At operation 318, the data steam and the validation data received as a result of the checks performed in operations 311-317 are transmitted to the smart contract and the Blockchain for processing. As alluded to above, the smart contract can be configured to generate verifiable claims, as described herein.

Thereafter, at operation 319, a check is performed to determine whether the data meet certain criteria, as defined by the smart contracts. The criteria can be business related criteria, for example being rules, parameters, or a context that governs the components necessary for a business transaction to take place (as set by an entity, or both entities, involved in the transaction). Accordingly, operation 319 serves to validate the business logic aspects that are related to the transaction. Process 300 has essentially already proven that the RoT-verifiable claim aspects of the interaction are valid, and that the data involved in the interaction are valid. Thus, operation 319 validates any necessary criteria that is specific to the business facets of the interaction, before the physical asset is accepted, and allowed to transact with the Blockchain IoT system. Referring back to the example, the receiving hospital and the donating hospital may have an agreement in place that ensures that certain requirements be met prior to accepting the organ, in accordance with certain medical, legal, and security obligations. This agreement between the hospitals thus can be deployed as a smart contract in the Blockchain that is accessible the Blockchain IoT system. Furthermore, as Blockchain has the feature of immutability, the smart contract corresponding to a business agreement is also immutable, remaining a permanent, indelible, and unalterable record of the Blockchain ledger. As a result, any point subsequent to implementing the smart contract for performing the transaction, the system should be able to verify that information that is pertinent to transaction, defined by the criteria in the smart contract, can be verified by accessing the Blockchain ledger and executing the smart contract. If operation 319 determines that the criteria in the smart contract are valid ("Yes), then the verifiable claim is approved and the transaction between the Blockchain IoT devices is allowed to automatically proceed in operation 320. In the example, proceeding with the transaction can involve the destination hospital ultimately approving and receiving the organ in the facility. Additionally, operation 320 can involve creating and issuing a new verifiable claim. For example, a new verifiable claim may be issued indicating that the transaction is approved and the physical asset is accepted into the Blockchain IoT system.

Thus, the process 300 realizes automation of trust, by leveraging RoT identity that is deployed at the hardware level, and integrating it with verifiable claims and the decentralized Blockchain. Furthermore, process 300 verifies the identity of the participants of the transaction (e.g., requesting device and validating device), while further validating the data t and the subsequent transaction in a trustworthy and automated manner.

Figure 4:
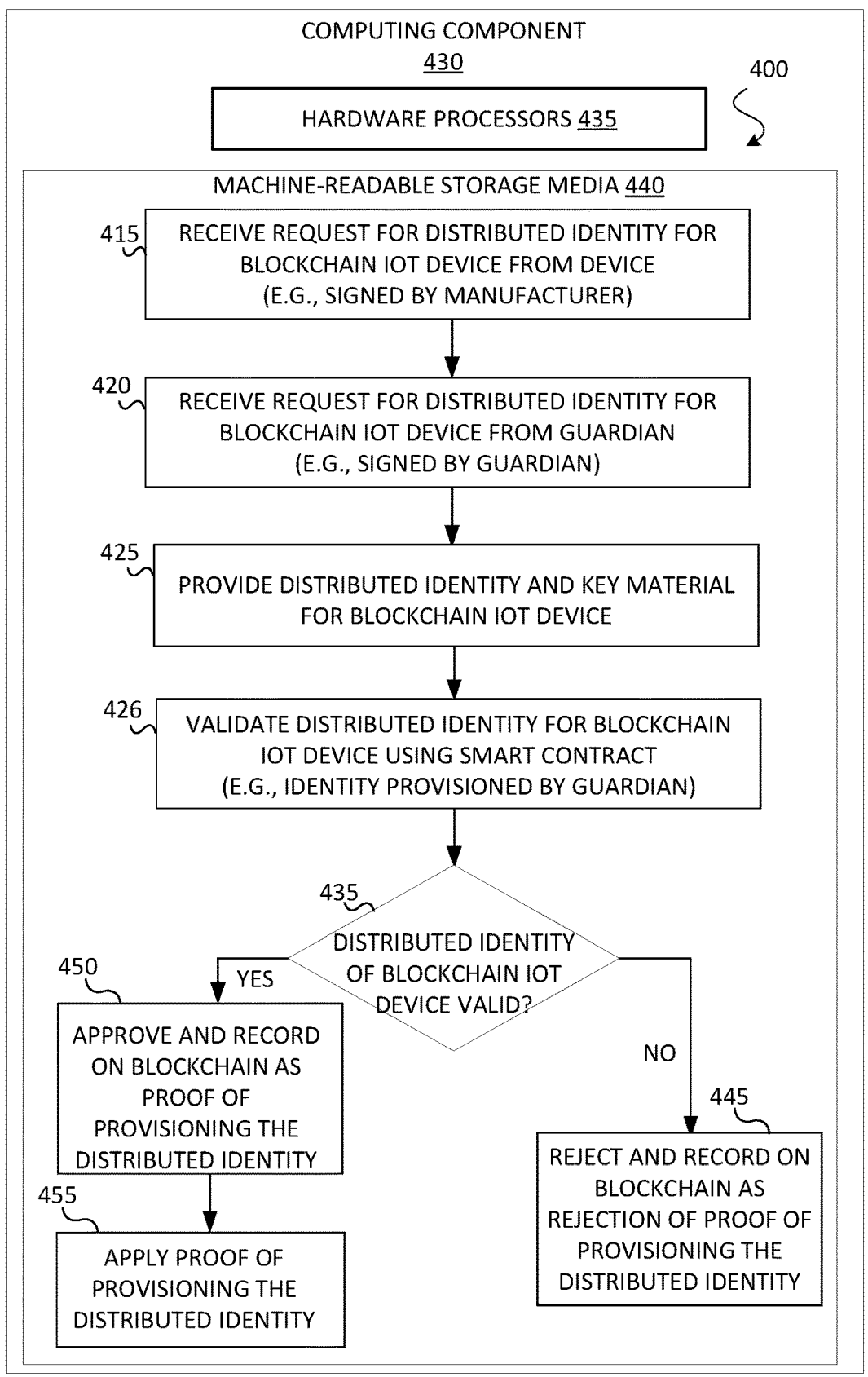
FIG. 4 is an operational flow diagram illustrating an example of a process for implementing provisioning of a distributed identity, according to some embodiments.

In FIG. 4, an example of a process 400 for implementing the provisioning of a distributed identity, as described herein, is shown. The process 400 can involve physical assets, such as a Blockchain IoT devices (shown in FIG. 1), establishing an identity that is decentralized, and thus can be distributed throughout an IoT system (e.g., to conduct transactions autonomously). In an embodiment, the process 400 is performed by a processing component of the Blockchain IoT system, such as the distributed identity provisioning sub-system (shown in FIG. 1). Accordingly, process 400 is illustrated as a series of executable operations stored in a machine-readable storage media 440, and being performed by hardware processors 435 in a computing component 430. Hardware processors 435 execute the operations of process 400, thereby implementing the disclosed techniques described herein.

The process 400 can begin in operation 415, where a request for a distributed identity for the Blockchain IoT device can be received from the Blockchain IoT device. In some cases, operation 415 involves transmitting attribute information relating to the Blockchain IoT device. Examples of attribute information can include, but is not limited to: serial number; software version; MAC address; shipped version number; and the like. The request for the distributed identity that is communicated in operation 415 can be signed by a party associated with the origin of the Blockchain IoT device, such as the manufacturer or by the Root of Trust installed in the identity requesting device, which may once again be validated.

Next, at operation 420, another request for the distributed identity for the Blockchain IoT device can be received. However, the request in operation 420 is communicated from a user associated with the Blockchain IoT device, also referred to as the guardian. Operation 420 can also involve requesting key material for the Blockchain IoT device. In some cases, operation 220 involves transmitting additional information relating to the guardian or user corresponding to the Blockchain IoT device. Examples of this information can include, but are not limited to: guardian name; asset name; organization name; and the like. The request of operation 420 can be signed by the guardian. For example, the request may be signed with a private key corresponding to the guardian. Thereafter, the process 400 continues to operation 425. The guardian's identity may also be a distributed identity based system.

At operation 425, in response to receiving the requests in previous operations 415, 420, the distributed identity and key material for the Blockchain IoT device are provided. In some cases, the distributed identity is provided to the guardian or guardian may download a code which helps it generate a private and public key pair and shares just the public key to the decentralized system. Then, the guardian can provision the key material into a secure module of the Blockchain IoT device, such as a Trusted Platform Module (TPM) or Trusted Execution Environment (TEE). After the distributed identity and keys are provisioned for the Blockchain IoT device, the process 400 can proceed to operation 426.

Subsequently, at operation 426, the distributed identity for the Blockchain IoT device is validated, signifying that the distributed identity was successfully provisioned. As previously described, this validation serves as a "proof" of provisioning the distributed identity on the Blockchain. Validation can involve the Blockchain IoT device performing an enrollment confirmation with its original attributes, and provisioned certificate. The Blockchain IoT device can communicate this enrollment confirmation and associated information, which indicates the identity that was actually provisioned in the device for validation. In the example, a check is performed at operation 435, which determines whether the distributed identity is validated. As a general description, operation 435 can include verifying the that distributed identity provisioned by the guardian in the Blockchain IoT device (as conveyed in the enrollment data), is consistent with the data related to both distributed identity requests received in previous operations 415 and 420. As an example, operation 435 may check whether the values for the MAC address, serial number, and shipped version number received in the request from the Blockchain IoT device matches the values for the media access control (MAC) address, serial number, and shipped version number in the enrollment data. Further, operation 435 may check whether the values for the guardian name, asset name, and organization name received in the request from the guardian match the values for guardian name, asset name, and organization name in the enrollment data. Determining that the request data is consistent (e.g., matches) against the enrollment data can indicate that provisioning the distributed identity was successful, and in turn, that the distributed identity of the Blockchain IoT device is valid ("Yes"). In the case where the distributed identity is validated by operation 435, the process 400 continues to operation 450. At operation 450, the distributed identity for the Blockchain IoT device is approved, and this successful validation is recorded on the Blockchain as a proof of provisioning the distributed identity.

Thereafter, the process can continue to operation 455, which involves applying the proof of the provisioned distributed identification. In some instances, use of this proof of the provisioned distributed identity is applied in a verification, for instance verifying by a custodian. As an example, after the distributed identity is provisioned into the RoT of the Blockchain IoT device, the Blockchain IoT device can start interacting with other physical handlers of the devices, referred to herein as custodians (e.g., airport baggage handlers, medical professionals (organ transplant), aircraft parts servicing orgs etc.). Then, the proof of provisioning the distributed identity of the Blockchain IoT device can be validated by all these parties to ensure that no physical tampering of the digital certificate is done and that they are interacting with the originally intended Blockchain IoT device of the right guardian. Once verified, subsequent transactions are carried out by the custodian. These transactions can also result in new verifiable claims being created.

Alternatively, in the case where the distributed identity is determined to be invalid by operation 435 ("No"), the process 400 continues to operation 445. Referring back to the example, if the request data is inconsistent (e.g., failed match) against the enrollment data, this may indicate that provisioning the distributed identity was unsuccessful. Thus, the distributed identity of the Blockchain IoT device is invalid. For example, the MAC address of the enrollment data may be different from the MAC address in the request that is received from the Blockchain IoT device. Accordingly, at operation 445, the distributed identity for the Blockchain IoT device is rejected. As a result of the failed validation, a rejection of the proof of provisioning the distributed identity is recorded on the Blockchain. Once on the Blockchain, the approval or rejection of the proof of the provisioning identity is maintained as an immutable record on the Blockchain that can be accessed by other entities and referred to during subsequent interactions.

As an example, in an automated transaction, the distributed identity for the Blockchain IoT device can be provided by an entity requiring that the Blockchain IoT device be authorized prior to executing the transaction. Then, a smart contract defining access control related to the distributed identity can process the received data, ensuring that the Blockchain IoT device is indeed authorized for this interaction based on the distributed identity. Moreover, once the proof of provisioning the distributed identity is established by process 400, the distributed identity can be used to enable various different autonomous application for the Blockchain IoT device, such as autonomous logistics, autonomous delivery, and autonomous delivery.

Figure 5:
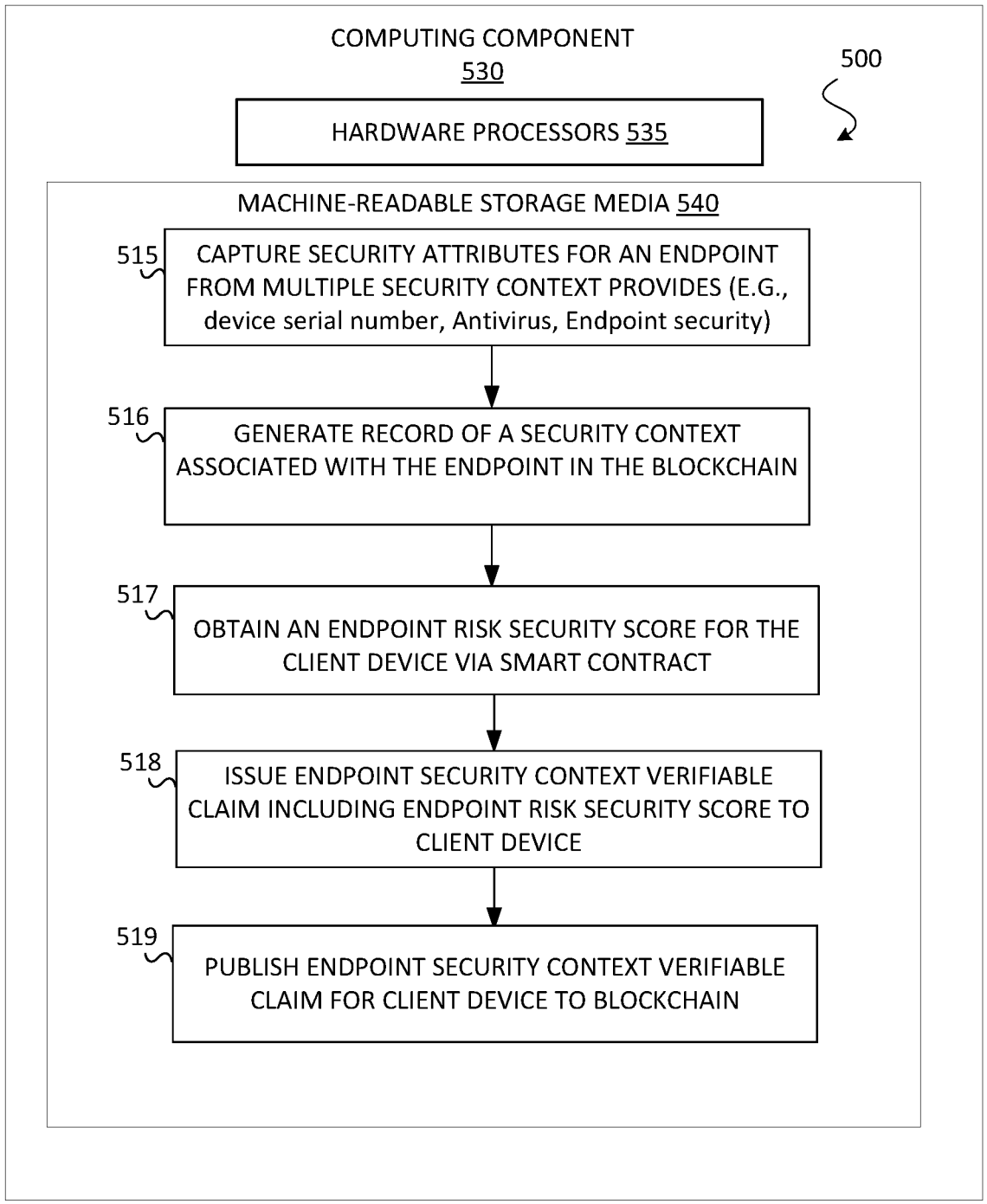
FIG. 5 is an operation flow diagram illustrating an example of a process for generating an endpoint security context variable claim for posture validation across multiple security checkpoints (e.g., different enterprise networks) via Blockchain, according to some embodiments.

Referring now to FIG. 5, an example of a process 500 that employs verifiable claims, as described herein, is depicted. In detail, the process 500 generates an endpoint security context variable claim for a client device, which can then be used for posture validation across multiple security checkpoints (e.g., different enterprise networks) via Blockchain. That is, the creation and deployment of endpoint security context variable claims enables the sharing of endpoint security posture information and collaboration between several enterprise networks, where this type of security information would otherwise be siloed for each security endpoint respectively. For example, after generating and endpoint security context verifiable claim using process 500 for a client device, multiple secured networks would be able to share this security posture information for the client device via, when required. As a result, in a "smart city" scenario, the client device would be able to move freely to any network within the city by supplying its endpoint security context variable claims for validation.

In some embodiments, the process 500 can be implemented by a Network Access Control (NAC) system that is associated with a particular endpoint, for example an enterprise or corporation. Thus, the process 500 is illustrated as a series of executable operations stored in a machine-readable storage media 540, and being performed by hardware processors 435 in a computing component 530. Hardware processors 535 execute the operations of process 400, thereby implementing the disclosed techniques described herein.

The process begins at operation 515, where security attributes from multiple security context providers are captured. The security attributes may be information used by an endpoint in order to validate a user and/or client device requesting access to an associated network. Security attributes can include, but are not limited to: device serial number; MDM; antivirus software data; endpoint security software data; Patch management data; and the like. The security context providers for an enterprise may be a firewalls, Antivirus software, Information Technology (IT) Security systems, Endpoint Security software, vulnerability assessment systems; and patch management systems. Information that is used to satisfy certain security requirements of the aforementioned security context providers may be captured when users are accessing the various networks and services that are provided within the enterprise.

Subsequently, at operation 516, a security context associated with that endpoint can be recorded in the Blockchain. In this instance, a security context can relate to the information and circumstances that form the setting for an event, such as validating security checks, in terms of which it can be understood and assessed. As alluded to above, a security context may be based on the types of information that is typically submitted by a user and validated in order for the user to pass security checks with respect to a specific endpoint (or enterprise). Accordingly, a security context is essentially derived from the information and/or security attributes captured in previous operation 515. By recording the security context for the endpoint on the Blockchain, the Blockchain serves as platform in which endpoint security context information can be exchanged between several different endpoints. When the Blockchain record is generated, a unique identifier and enterprise information corresponding to the particular endpoint can also be included in the record. Ultimately, the unique identifier and enterprise information can be used to link the Blockchain record, and the security context therein, to the corresponding endpoint.

Next, in operation 517, an endpoint security risk score for a client device can be obtained. According to the embodiments, a smart contract on the Blockchain is configured to generate an endpoint security risk score for a client device on the ecosystem. For instance, based on the security context for an endpoint that is on the Blockchain, a smart contract can calculate a score that is indicative of a level of trust relating to a particular client device. The endpoint security risk score may be governed by the client device's ability to be verified, or pass the security checks, with a certain endpoint based on its security context. In some cases, a high score suggests that the client device may be a high security risk, or may not be able to be validated via the security checks deemed necessary by the endpoint's security context. As an example, a client device may be assigned an endpoint security risk score of 85%, indicating that the client device has a high risk of being a potential security threat (or failing validation) for that endpoint. Alternatively, a lower endpoint risk security score suggests that the client device has a strong potential of being successfully validated against the endpoint's security context. In other words, a client device with a low endpoint security risk score is potentially less of a security risk if allowed access by endpoint. The endpoint security risk score for a client can be specific to an enterprise (or company). However, in some cases, the endpoint security risk score for a client is an overall score at the ecosystem level, being a composite of scores from multiple different endpoints and enterprises.

At operation 518, an endpoint security context verifiable claim for the client device may be issued to them. The endpoint security context verifiable claim can be a type of verifiable claim that particularly includes information relating to the client device that can be used for validation against the security checks and policies of that endpoint. In the embodiments, the endpoint security risk score obtained in previous operation 517 is included in the endpoint security context verifiable claim. The endpoint security context verifiable claim can also include the client device specific information for each security attribute within the security context. For example, if the security context for an endpoint includes: device serial number; antivirus; and endpoint security, an associated endpoint security context verifiable claim would include a value for the client device in each attribute. As an example, an endpoint security context verifiable claim can include: device serial number—"878jubjubuyt" (e.g., client device's serial number); antivirus—"Norton Antivirus version 10.7" (e.g., name of antivirus software); endpoint security—"huhgjnbj version 5.8"" (e.g., name of endpoint security software). The endpoint security context verifiable claim can also include other types of information related to the client device, including, but not limited to: a device identifier; an owner name; a custodian name; and the like. The verifiable claim can be issued to the client device signed with a digital signature corresponding to the issuer, for instance the enterprise of the endpoint. As such, the security posture and context information resides with the client device (and the verifier). The client device has control over when this information is shared and with whom, which improves data privacy of the client device.

In addition to issuing the security context verifiable claim to the client device, the verifiable claim is also published on the Blockchain in operation 519. A hash value of the endpoint security context verifiable claim and a time stamp can be recorded on the Blockchain. The security context verifiable claim can be maintained in the distributed ledger of the Blockchain. Accordingly, during a future verification of the client device at a security check point (or endpoint) in the ecosystem, this endpoint security context verifiable claim for the client device that on the Blockchain can be accessed. Therefore, the endpoint security context verifiable claim serves as a type of credential that can be shared by different security checkpoints via the Blockchain to allow the client device to be validated. By maintaining the security data in a distributed manner via the Blockchain, the participating entities in the ecosystem essential own and exchange the data, as opposed to a third-party authentication/authorization point as used in many conventional security systems. The client device can share its endpoint security context verifiable claim every time it attempts to connect to a new network in the ecosystem, as oppossed to providing additional information at each checkpoint individually. When a client device submits its endpoint security context verifiable claim to a security checkpoint, such as a firewall, the checkpoint can compare the version received directly from the client device to the corresponding endpoint security context verifiable claim that is maintained by the Blockchain. By validating the endpoint security context verifiable claim, the client device also proves its verification against the security context and policies of the security checkpoint. Even further, a successful verification of a client can be maintained as an immutable record on the Blockchain, as a type of client history that can be referred to in subsequent access attempts and/or audits.

Accordingly, the process 500 provides a truly vendor agnostic security process. The Blockchain acts a global platform for collecting and accessing security context that can be trusted when used by other entities. In other words, in the process 500, a security posture verified by one endpoint via the security context verifiable claim, can be trusted by others in the ecosystem. Thus, a security context can be levered for multiple connections whether the endpoint is connecting within a corporate network, a public Wi-Fi network, or an at home network provided by an Internet Service Provider (ISP). Moreover, the Blockchain serves as a single point of trust for authorizing device in process 500, rather than a plethora of individual connections to different security points, thereby saving resources and reducing costs.

Figure 6:
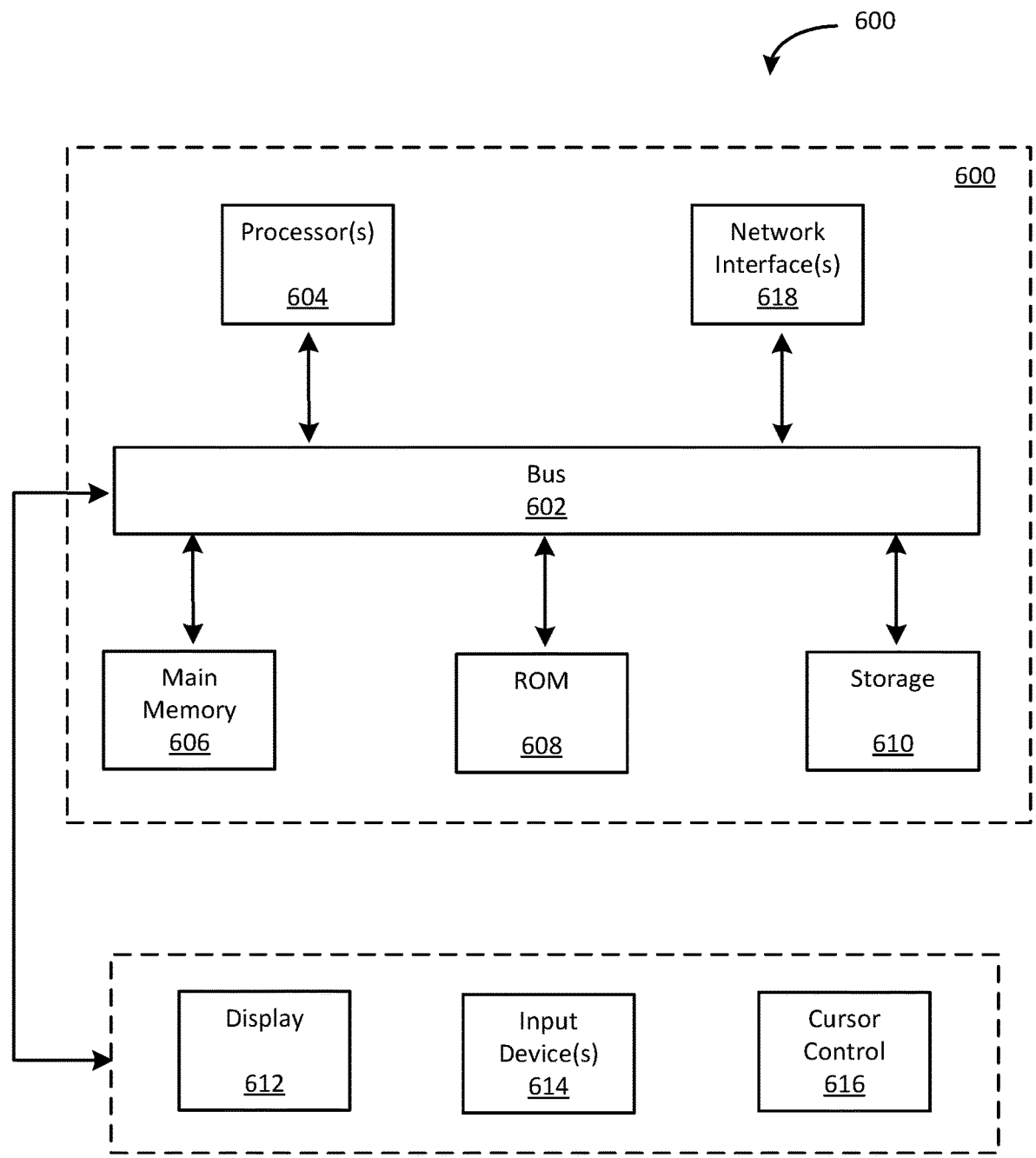
FIG. 6 illustrates an example computer system that may be used in implementing verifiable claims for physical assets, relating to the embodiments of the disclosed technology.

FIG. 6 depicts a block diagram of an example computer system 600 in which the disclosed user verifiable claims for physical assets techniques may be implemented. For example, the computer system 600 may be embedded inside of the Blockchain IoT device, as described above, or any other component or subsystem. Furthermore, it should be appreciated that although the various instructions are illustrated as being co-located within a single processing unit, in implementations in which processor(s) includes multiple processing units, one or more instructions may be executed remotely from the other instructions.

The computer system 600 includes a bus 602 or other transmission mechanism for communicating information, one or more hardware processors 604 coupled with bus 612 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 408 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a, e-ink or liquid crystal display (LCD) (or touch screen), for displaying information to a computer user. The computer system 600 may include other input/output devices, such as speakers, microphones, and the like for enabling audio and/or voice for input and output of information, data, and commands. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computer system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 616. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 510, are example forms of transmission media.

The computer system 600 can send messages and receive data, including program code, through the network(s), network link and communication interface 518. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   automatically validating, by a verifiable claim sub-system, a verifiable claim presented by a Blockchain Internet-of-things (IoT) device;
   in response to successfully validating the verifiable claim, automatically validating a data stream presented by the Blockchain IoT device;
   in response to successfully validating the data stream, automatically validating a business logic associated with a transaction involving the Blockchain IoT device;
   in response to successfully validating the business logic, automatically
   approving the verifiable claim and executing the transaction involving the Blockchain IoT device,
   wherein the transaction is executed based on a context defined by the validated verifiable claim; and
   in response to executing the transaction, creating a new verifiable claim for a new transaction.

2. The method of claim 1, wherein validating the presented verifiable claim comprises:
   determining that a digital transaction associated with the verifiable claim and digital certificate associated with the identity of the Blockchain IoT device is present on a Blockchain and is valid.

3. The method of claim 2, wherein the verifiable claim presented by the Blockchain IoT device is associated with a Root of Trust (RoT) embedded on the IoT device.

4. The method of claim 3, wherein validating the verifiable claim presented by the Blockchain IoT device comprises:
   establishing a proof of the RoT embedded on the IoT device.

5. The method of claim 4, wherein validating the data stream presented by the Blockchain IoT device comprises:
   determining whether a signature in the data based on the established proof of the RoT is valid.

6. The method of claim 5, wherein validating the data stream presented by the Blockchain IoT device comprises:
   determining whether data attributes from the data stream that are associated with monitored conditions of the Blockchain IoT device are valid.

7. The method of claim 1, wherein validating the business logic associated with the transaction involving the Blockchain IoT device comprises:

determining whether data from the data stream satisfies the criteria of the business logic defined in a smart contract on a Blockchain.

8. The method of claim 7, wherein the Blockchain IoT device is a physical asset.

9. The method of claim 1, wherein validating the verifiable claim, validating the data stream, and both validating the data stream and generation of a new verifiable claim as a proof of this transaction are automated.

10. A Blockchain Internet-of-things (IoT) system, comprising:
- a plurality of Blockchain IoT devices, wherein at least one of the plurality of Blockchain IoT devices comprises a hardware Root of Trust (RoT) embedded thereon;
- a Blockchain network coupled to the Blockchain IoT device; and
  - a verifiable claim sub-system coupled to the Blockchain IoT network, wherein the verifiable claim sub-system is configured to:
- automatically validate a verifiable claim;
  - in response to successfully validating the verifiable claim, automatically validate a data stream;
  - in response to successfully validating the data stream, automatically validate a business logic associated with a transaction within the Blockchain IoT system;
  - in response to successfully validating the business logic, automatically approve the verifiable claim and execute the transaction within the Blockchain IoT system, wherein the transaction is executed based in a context defined by the validated verifiable claim; and
- in response to executing the transaction, issue a new verifiable claim for a new transaction.

11. The system of claim 10, wherein the Blockchain IoT device comprises at least one of a radio frequency identification (RFID) tag, an RFID scanner, a Bluetooth device, a Bluetooth reader or any other source of machine-readable or -receivable data from the physical world.

12. The system of claim 11, wherein the transaction within the Blockchain IoT system comprises a communication between the Blockchain IoT device with the hardware RoT and another one of the plurality of Blockchain IoT devices.

13. The system of claim 12, wherein the Blockchain network maintains a digital certificate associated with the Blockchain IoT device with the hardware RoT.

14. The system of claim 13, wherein the Blockchain IoT device with the hardware RoT presents the variable claim, and the verifiable claim is associated with the hardware RoT.

15. The system of claim 14, wherein the verifiable claim sub-system validates the verifiable claim by establishing a proof of the hardware RoT.

16. The system of claim 15, wherein the verifiable claim sub-system establishes a proof of the hardware RoT by accessing the Blockchain to validate the digital certificate associated with the Blockchain IoT device with the hardware RoT.

17. The system of claim 16, wherein the Blockchain IoT device with the hardware RoT presents the data stream.

18. The system of claim 17, wherein the verifiable claim sub-system validates the data stream by determining whether a signature associated with the Blockchain device with the hardware RoT is valid.

19. The system of claim 18, wherein the verifiable claim sub-system validates the data stream by determining whether the hardware RoT is untampered and valid and can issue a new verifiable claim for the current transaction based on the business logic.

* * * * *